US012222827B2

(12) United States Patent
Kangarlou

(10) Patent No.: US 12,222,827 B2
(45) Date of Patent: Feb. 11, 2025

(54) COST-EFFECTIVE, FAILURE-AWARE RESOURCE ALLOCATION AND RESERVATION IN THE CLOUD

(71) Applicant: NetApp, Inc., San Jose, CA (US)

(72) Inventor: Ardalan Kangarlou, Cary, NC (US)

(73) Assignee: NetApp, Inc., San Jose, CA (US)

( * ) Notice: Subject to any disclaimer, the term of this patent is extended or adjusted under 35 U.S.C. 154(b) by 149 days.

(21) Appl. No.: 17/898,824

(22) Filed: Aug. 30, 2022

(65) Prior Publication Data

US 2024/0070038 A1 Feb. 29, 2024

(51) Int. Cl.
*G06F 11/00* (2006.01)
*G06F 9/50* (2006.01)
*G06F 11/20* (2006.01)
*G06F 11/30* (2006.01)

(52) U.S. Cl.
CPC ........ *G06F 11/2025* (2013.01); *G06F 9/5072* (2013.01); *G06F 9/5077* (2013.01); *G06F 11/2028* (2013.01); *G06F 11/203* (2013.01); *G06F 11/2069* (2013.01); *G06F 11/301* (2013.01); *G06F 2209/503* (2013.01); *G06F 2209/505* (2013.01)

(58) Field of Classification Search
CPC ............. G06F 11/2025; G06F 11/2028; G06F 11/203; G06F 11/2069; G06F 11/2092; G06F 11/3442; G06F 11/301; G06F 9/5072; G06F 9/2077
See application file for complete search history.

(56) References Cited

U.S. PATENT DOCUMENTS

| | | | |
|---|---|---|---|
| 8,429,449 B2 | 4/2013 | Biran et al. | |
| 9,565,080 B2* | 2/2017 | Jain | H04L 67/63 |
| 11,249,790 B1* | 2/2022 | Gupta | G06F 9/5077 |
| 11,675,678 B1* | 6/2023 | Sharma | G06F 11/203 |
| | | | 714/4.11 |
| 2013/0262915 A1* | 10/2013 | Frank | H04L 41/00 |
| | | | 714/4.11 |
| 2013/0311824 A1* | 11/2013 | Ji | G06F 11/1438 |
| | | | 707/639 |
| 2015/0248305 A1* | 9/2015 | Shu | G06F 9/5077 |
| | | | 718/1 |

(Continued)

OTHER PUBLICATIONS

Bin E., et al., "Guaranteeing High Availability Goals for Virtual Machine Placement," IBM Haifa Research Lab, pp. 1-10.
Cloud NetApp., "High Availability Cluster: Concepts and Architecture," Cloud Story, 2020, pp. 1-25. Retrieved from Internet : https://cloud.netapp.com/blog/cvo-blg-high-availability-cluster-concepts-and-architecture.

(Continued)

*Primary Examiner* — Elmira Mehrmanesh
(74) *Attorney, Agent, or Firm* — Jaffery Watson Hamilton & DeSanctis LLP

(57) ABSTRACT

Systems and methods for an improved High-Availability (HA) resource reservation approach are provided. According to one embodiment, for a given cluster of greater than two nodes in which a number (f) of concurrent node failures are to be tolerated, more efficient utilization of resources for an HA system may be achieved by distributing HA reserved capacity across more than f nodes of the cluster rather than naively concentrating the HA reserved capacity in f nodes. As node failures are not a common occurrence, those of the nodes of the cluster having HA reserved capacity may allow for some bursting of one or more units of compute executing thereon unless or until f concurrent node failures occur, thereby promoting more efficient utilization of node resources.

20 Claims, 18 Drawing Sheets

(56) References Cited

U.S. PATENT DOCUMENTS

| | | | | |
|---|---|---|---|---|
| 2016/0203064 A1* | 7/2016 | Ren | ................... | G06F 11/2069 |
| | | | | 714/4.12 |
| 2017/0168907 A1* | 6/2017 | Harper | ................ | G06F 11/2025 |
| 2018/0165166 A1* | 6/2018 | Wang | ................. | G06F 11/2033 |
| 2020/0042411 A1* | 2/2020 | Krishnan | ............ | G06F 11/2048 |
| 2020/0285502 A1* | 9/2020 | Hildebrand | ......... | G06F 9/45554 |
| 2021/0357248 A1* | 11/2021 | Shibayama | ........... | G06F 3/0631 |
| 2021/0392185 A1* | 12/2021 | Einkauf | ................ | G06F 9/5077 |
| 2022/0382721 A1* | 12/2022 | Muthukrishnan | ... | H04L 67/1012 |
| 2023/0229561 A1* | 7/2023 | Iyer | .................... | G06F 11/1438 |
| | | | | 711/162 |
| 2024/0069974 A1* | 2/2024 | Qi | .......................... | G06F 9/505 |
| 2024/0069979 A1* | 2/2024 | Sakthivel | .............. | G06F 9/5077 |

OTHER PUBLICATIONS

Hunter A., "HA Architecture—An Introduction to High Availability," 2022, pp. 1-5. Retrieved from internet : https://www.parallels.com/blogs/ras/ha-architecture/.

NetApp., "High-Availability Configuration Guide," ONTAP 9.8, 2021, pp. 1-56.

NetApp., "High-Availability Pairs," Cloud Volumes ONTAP, 2022, pp. 1-16. Retrieved from Internet: https://docs.netapp.com/us-en/cloud-managercloud-volumesontap/concept-ha.html.

NetApp., "NetApp High Availability-FlackBox," NetApp ONTAP High Availability Architecture, 2022, pp. 1-10.

Wikipedia "High-Availability Cluster," Wikipedia, 2022, pp. 1-5. Retrieved from https://en.wikipedia.org/w/index.php?title=High-availability_cluster&oldid=1085114380.

* cited by examiner

COST-EFFECTIVE, FAILURE-AWARE RESOURCE ALLOCATION AND RESERVATION IN THE CLOUD

BACKGROUND

Field

Various embodiments of the present disclosure generally relate to implementation of a high-availability (HA) model for a service in the cloud. In particular, some embodiments relate to an approach for identifying an optimal distribution of reserved resource capacity across nodes of a cluster to tolerate an estimated node failure rate.

Description of the Related Art

Distributed cloud services and applications may run across many nodes (e.g., servers). These services may be run as processes, virtual machines (VMs), or containers on the nodes. In the context of Kubernetes services, each instance of an application that makes up the distributed service is referred to as a Pod. Regardless of the manner in which an application instance is managed or represented (e.g., as a set of one or more processes, VMs, containers, or Pods) as part of a particular cloud service, a given application instance consumes resources (e.g., memory resources, processing resources (such as central processing units (CPU) or CPU cores), and storage resources (such as local and/or network storage)).

Failures are a common occurrence in large systems. For example, nodes on which one or more application instances are deployed may fail due to the failure of hardware components (e.g., memory or disks) and/or software components (e.g., operating systems or device drivers). Distributed applications running on nodes can also fail due to software bugs, running out of compute resources, or hardware infrastructure failures. A highly available system generally refers to a system designed to be fault-tolerant, highly dependable, operate continuously without manual intervention, or otherwise lacking a single point of failure. HA provides a failover solution in the event of a node failure and/or planned maintenance activities.

SUMMARY

Systems and methods are described for an improved HA resource reservation approach. According to one embodiment, information indicative of a number (n) of nodes that are part of a cluster and an amount (p) of resources to support a given unit of compute (e.g., a process, a Virtual Machine (VM), a container, or a Kubernetes Pod) of multiple units of compute to be scheduled for execution by the cluster are received. For a number (f) of concurrent node failures to be tolerated by the cluster, a schedule for the cluster is created that accommodates concurrent execution of all of the multiple units of compute by the cluster while reserving resource capacity within the cluster for failover by, for each unit of compute of the multiple of units of compute: (i) assigning the unit of compute to a primary node of the cluster on which the unit of compute will be deployed; and (ii) earmarking units of high-availability (HA) reserve each having p resources within f different secondary nodes of the cluster to accommodate failover of the unit of compute in the event of a failure of the primary node, in which each of the units of HA reserve have not been earmarked for any other unit of compute of the multiple units of compute assigned to the primary node. The multiple units of compute are then scheduled for execution on the nodes of the cluster in accordance with the schedule.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
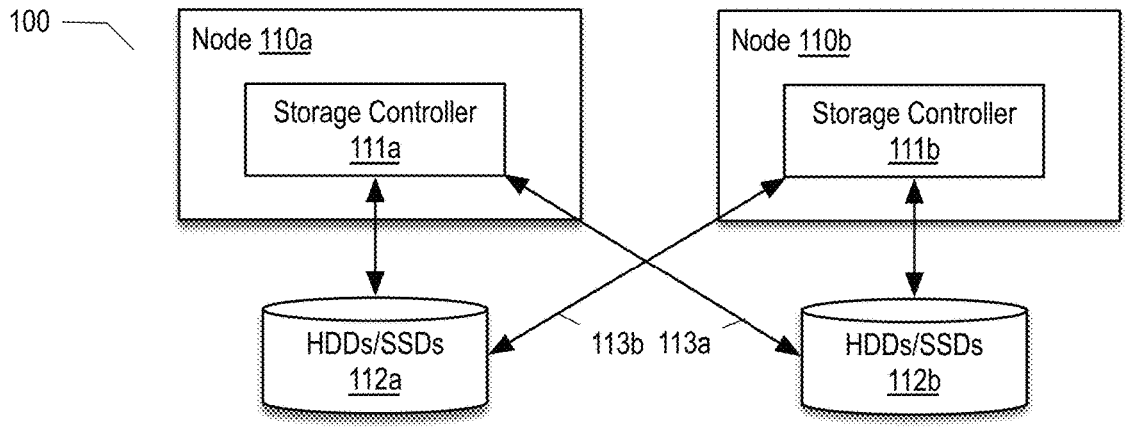
FIG. 1A is a block diagram illustrating an example of a two-node storage cluster implementing a tightly coupled HA model.

Systems and methods are described for an improved HA resource reservation approach. As noted above, HA provides a failover solution in the event of a node failure, network failure, and/or planned maintenance activities. FIG. 1A is a block diagram illustrating an example of a two-node storage cluster 100 implementing a tightly coupled HA model. In this example, the storage cluster 100 is shown including two physical nodes (e.g., nodes 110*a-b*) configured to operate an HA pair, which each node 110 acting as an HA partner to the other. Each node 110 includes respective storage controllers 111*a-b* coupled to respective storage devices (e.g., one or more hard-disk drive (HDDs) and/or solid-state drives (SSDs)), which might be housed within respective disk shelves (not shown). In this example, there is a tight coupling between the storage controllers 111*a-b* and the corresponding storage devices as, in addition to the configured HA relationship, physical HA interconnects 113*a-b* couple the storage controllers 111*a-b* to the HA partner node's disk shelves to allow the healthy HA partner to serve input/output (I/O) requests of workloads that were previously being directed to the failed node while also continuing to serve I/O requests of workloads directed to the healthy HA partner without any impact to the service (e.g., additional I/O latency, lower I/O throughput) provided by the cluster 100. Some existing storage systems achieve HA by implementing an active-passive model in which one storage controller is run in active mode and a redundant storage controller is run in standby mode as illustrated by FIG. 1C. Another HA approach illustrated by FIG. 1B is referred to as an active-active model, involves the use of two active controllers in which each controller runs at 50% capacity at most.

Figure 1B:
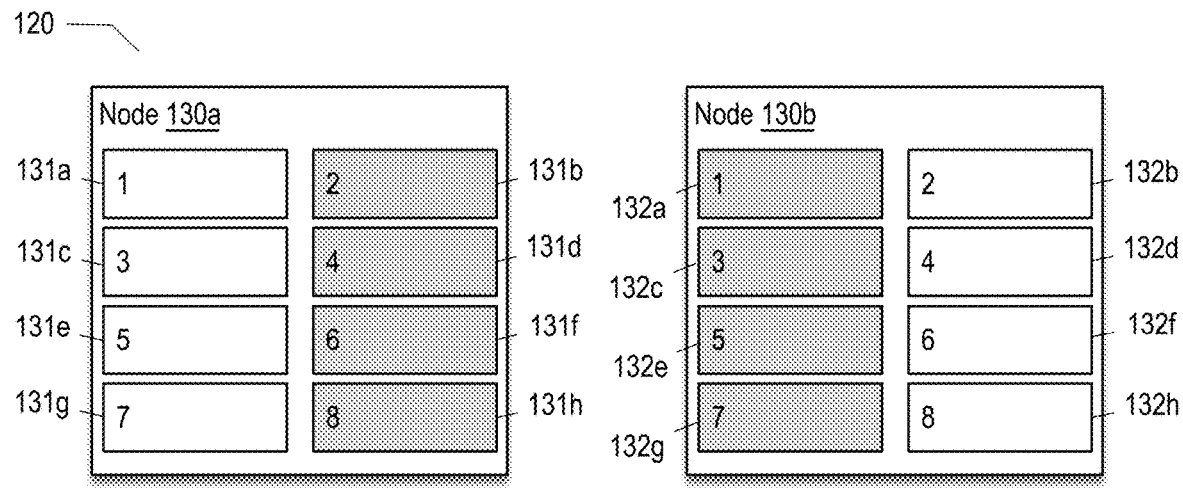
FIG. 1B is a block diagram illustrating system utilization in the context of an active-active cluster deployment in which there is a tight coupling between HA partners.
Figure 1C:
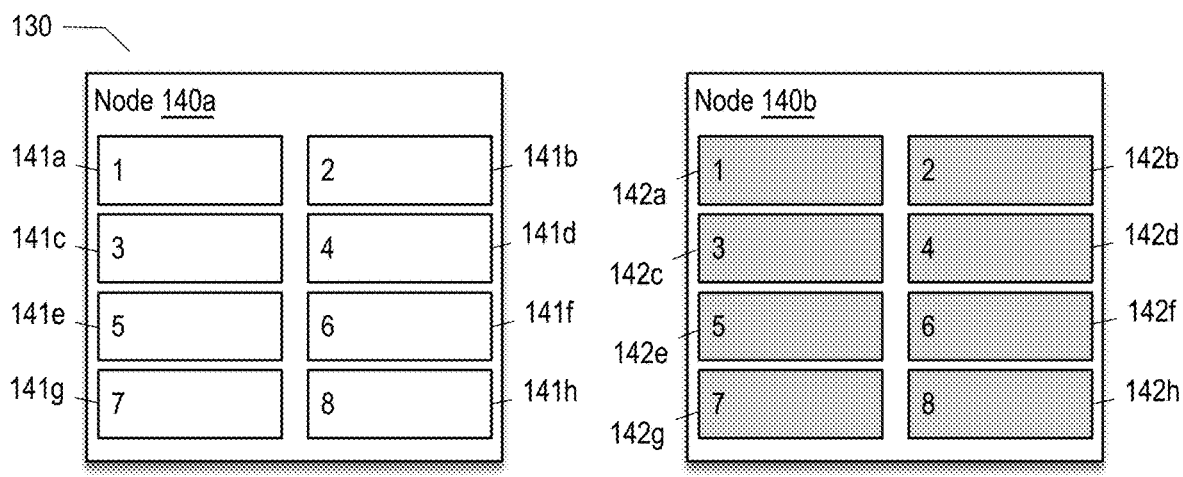
FIG. 1C is a block diagram illustrating system utilization in the context of an active-passive cluster deployment in which there is a tight coupling between HA partners.

FIG. 1B is a block diagram illustrating system utilization in the context of an active-active cluster deployment 120 in which there is a tight coupling between HA partners (e.g., nodes 130*a-b*). In this example, each node 130*a-b* includes respective rectangles (e.g., 131*a-h* and 132*a-h*) each logically representing resource capacity (e.g., memory resource capacity, processing resource capacity, and/or storage resource capacity) that may be utilized by one or more active units of compute (e.g., processes, VMs, containers, or Kubernetes pods) running on the node or reserved for supporting failover from the HA partner node. In various examples described herein, the rectangles may represent a multiple of p resources (e.g., 1p or 2p). In this example, each node 130*a-b* is assumed to have the capacity to host eight units of compute having integer identifiers (IDs) 1-8, where a combination of four units of compute may represent, for example, processes of a controller (e.g., one of storage controllers 111*a* or 111*b*) operating at 50% capacity. As shown, each rectangle includes a corresponding integer ID of one of the units of compute. In the case of the rectangles having a white background, the integer ID corresponds to the ID of a unit of compute scheduled for deployment there, thus exclusively consuming the associated resource capacity. In the case of the rectangles having a gray background, the integer ID corresponds to a unit of compute that has been mapped to the unit of HA reserve represented by the rectangle. That is, the unit of HA reserve is reserved to accommodate failover of the specified unit(s) of compute from the HA partner. For example, units of compute having IDs 1, 3, 5, and 7 are deployed using the resources represented by rectangles 131*a*, 131*c*, 131*e*, and 131*g*, respectively, of node 130*a* and units of compute having IDs 2, 4, 6, and 8 are deployed using the resources represented by rectangles 132*b*, 132*d*, 132*f*, and 132*h*, respectively, of node 130*b*. Additionally, units of HA reserve represented by gray rectangles 131*b*, 131*d*, 131*f*, and 131*h* of node 130*a* are reserved to accommodate failover of units of compute having IDs 2, 4, 6, and 8, respectively, should node 130*b* experience a failure and units of HA reserve represented by gray rectangles 132*a*, 132*c*, 132*e*, and 132*g* of node 130*b* are reserved to accommodate failover of units of compute having IDs 1, 3, 5, and 7, respectively, should node 130*a* experience a failure. The reason for capping the controllers to run at half utilization of the total available resource capacity is, in the case of one controller failing, to allow the healthily controller to serve workloads directed to both controllers without clients observing an impact to the service (e.g., in terms of additional input/output (I/O) latency or lower I/O throughput) represented by the collection of units of compute.

FIG. 1C is a block diagram illustrating system utilization in the context of an active-passive cluster deployment 130 in which there is a tight coupling between HA partners. As above, in this example, each node 140*a-b* includes respective rectangles (e.g., 141*a-h* and 142*a-h*) each representing resource capacity that may be utilized by one or more active units of compute running on the node or that is reserved for supporting failover from the HA partner node. Again, for purposes of illustration, each node 140*a-b* is assumed to have the capacity to host eight units of compute having integer IDs 1-8; however, in this case the combination of eight units of compute may represent, for example, processes of a controller (e.g., one of storage controllers 111*a* or 111*b*) operating at 100% capacity. Also, as above, each rectangle includes a corresponding integer ID of one of the units of compute. In the case of the rectangles having a white background, the integer ID corresponds to the ID of a unit of compute scheduled for deployment there, thus exclusively consuming the associated resource capacity. In the case of the rectangles having a gray background, the integer ID corresponds to the ID of a unit of compute that can take advantage of the resources associated with a unit of HA reserve during failover.

In this active-passive cluster deployment example, units of compute having IDs 1-8 are deployed using resources represented by rectangles 141*a-h*, respectively, of node 140a, units of HA reserve represented by gray rectangles 142a-h of node 140b are reserved to accommodate failover of units of compute having IDs 1-8, respectively, should node 140a experience a failure.

Notably, as can be seen with reference to FIGS. 1B and 1C, regardless of whether an active-active cluster deployment or an active-passive cluster deployment is implemented to support HA in the context of a tightly coupled HA model, the combined utilization of available resource capacity of the clusters 120 and 130 is limited to fifty percent. Given node failures are relatively unlikely, one major disadvantage to the foregoing dual-controller HA model is half of the available node resources are effectively wasted in order to tolerate a single node failure while avoiding impact to workloads. Additionally, if both storage controllers fail, clients (e.g., applications making use of the storage system represented by the cluster (e.g., cluster 100, 120, or 130)) will experience storage downtime. For purposes of comparison, to various embodiments of the present disclosure, the foregoing tightly coupled HA models, imposing strict relationships between HA partner nodes may be referred to as the "naive tightly-coupled HA reservation implementation."

As will be appreciated, in a cloud environment, cloud-native architectures based on container orchestration platforms (e.g., Kubernetes) have changed the way applications are built. Instead of heavy-weight, monoliths that do not scale very well, cloud-native architectures tend to be made up of smaller components referred to as microservices that run on many nodes across different servers or cloud availability zones or regions. Additionally, in a cloud environment, nodes of a cluster may more easily make use of shared storage, thereby facilitating the decoupling of node-to-storage relationships and HA pairings more commonly found in on-premise deployments. As a result, a cloud-based HA model may rely on the ability to quickly failover execution units (e.g., containers or pods) from an unhealthy node to a healthy node as shown in FIGS. 2A and 2B.

Figure 2A:
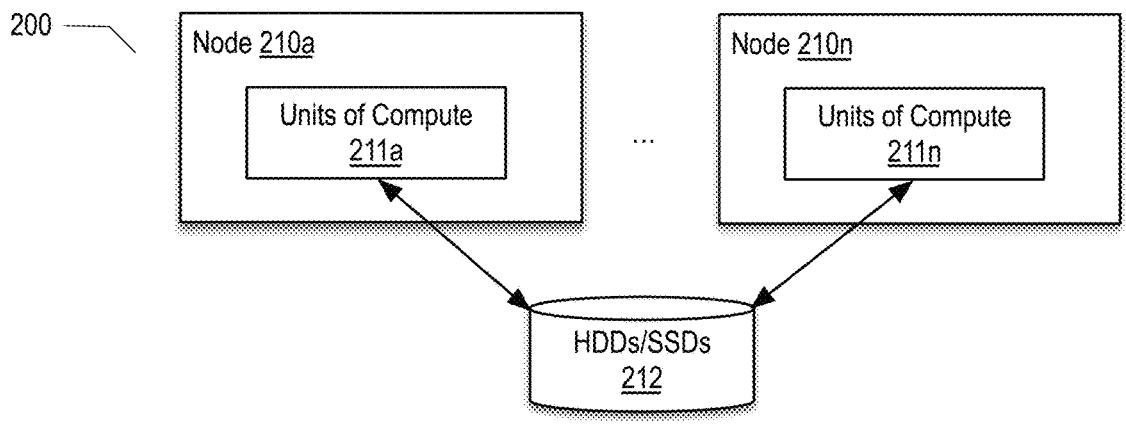
FIG. 2A is a block diagram illustrating an example of a two-node storage cluster implementing a loosely coupled HA model.

FIG. 2A is a block diagram illustrating an example of a two-node storage cluster 200 implementing a loosely coupled HA model. In this example, the storage cluster 200 is shown including multiple nodes (e.g., nodes 210a-n) implementing respective virtual storage controllers (e.g., one or more units of compute 211a-n in the form of containers or pods) that may make use of shared storage (e.g., one or more hard-disk drive (HDDs) and/or solid-state drives (SSDs)) presented to the nodes 210a-n as cloud volumes by an operating system, a user-space utility, a hypervisor, or a container orchestration framework. In this example, due to the ability of the units of compute 211a-n to be more easily relocated and the absence of strict node-to-storage relationships, the units of compute 211a-n of an unhealthy node need not be migrated to reserved resources of an HA partner node and instead may be brought up on a healthy spare node that is available to support failover from any other node in the four-node cluster as shown in FIG. 2B.

Figure 2B:
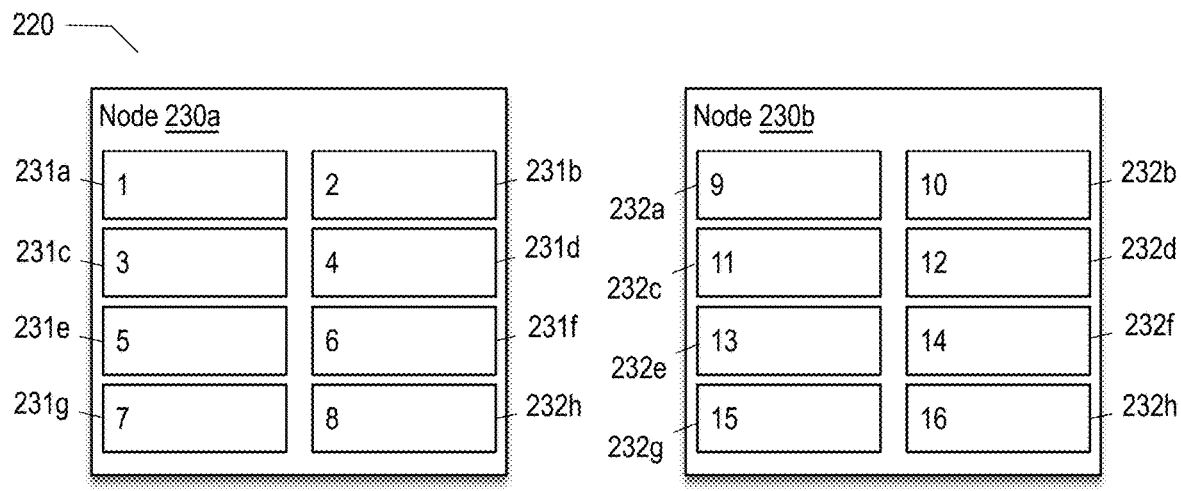
FIG. 2B is a block diagram illustrating system utilization in the context of a loosely coupled HA reservation implementation.
Figure 2B:
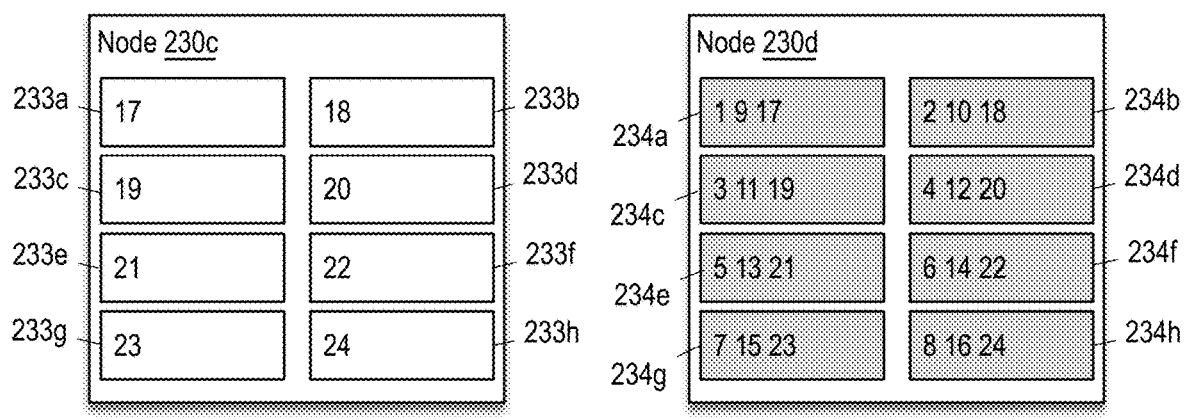

FIG. 2B is a block diagram illustrating system utilization in the context of a cluster 220 making use of a loosely coupled HA reservation implementation. In this example, each node 230a-c includes respective rectangles having a white background (e.g., 231a-h, 232a-h, and 233a-h) representing resource capacity that may be utilized by one or more active units of compute running on the node, whereas the rectangles of node 230d having a gray background (e.g., rectangles 234a-h) represent a unit of HA reserve reserved for supporting failover from an unhealthy node of nodes 230a-c. In this example, should any of nodes 230a-c experience a failure, their respective units of compute may be brought up on node 230d and utilize the reserved resource capacity of the unit of HA reserve to which it is mapped on node 230d. In this manner, a four-node cluster may operate at 75% utilization, representing an improvement over the resource utilization of the naive tightly coupled HA reservation implementation, which would require two HA pairs each operating at 50% utilization during normal operation (i.e., no failures). For purposes of comparison with various embodiments of the present disclosure, the foregoing loosely coupled HA model may be referred to as the "naive loosely coupled HA reservation implementation." While the naive loosely coupled HA reservation implementation improves resource utilization achievable by the naive tightly coupled HA reservation implementation, limitations remain. For example, there is no capacity for the units of compute to burst beyond their current resource utilizations as there is no excess capacity remaining on the active nodes.

In order to achieve more efficient utilization of resources for an HA system, for example, by accommodating bursting of the units of compute, while also tolerating multiple concurrent node failures, embodiments described herein provide an improved HA resource reservation approach by distributing the reserved capacity across a cluster of greater than two nodes in such as manner so as to avoid service disruption while tolerating a desired number of node failures. As described further below, in one embodiment, the number (n) of nodes that are part of a cluster and the amount (p) of resources to support a given unit of compute of multiple units of compute to be scheduled for execution by the cluster is known and may be provided as an input to a scheduling algorithm, for example, implemented by a scheduler of a container orchestration platform (e.g., a Kubernetes scheduler). For a number (f) of concurrent node failures to be tolerated by the cluster, in which f may be derived or otherwise assumed based on any of a variety of approaches (e.g., a mean time between failures (MTBF) and/or a mean time to failure (MTTF) analysis), a schedule for the cluster may be created that accommodates concurrent execution of all of the multiple units of compute by the cluster while reserving resource capacity within the cluster for failover. Creation of the schedule may involve looping through each unit of compute of the multiple of units of compute to (i) assign the unit of compute to a primary node of the cluster on which the unit of compute will be deployed; and (ii) earmark units of HA reserve each having p resources within f different secondary nodes of the cluster so as to accommodate failover of the unit of compute in the event of a failure of the primary node, in which each of the units of HA reserve have not been earmarked for any other unit of compute of the multiple units of compute assigned to the primary node. After the schedule has been created, the multiple units of compute may then be scheduled for execution on the nodes of the cluster in accordance with the schedule.

While in the context of various examples described herein a pod may be assumed to be the smallest unit of execution or unit of compute, it is to be appreciated the methodologies described herein are not limited to any particular unit of compute and are generally applicable to other cloud services implementations including those managed as processes, VMs, or containers. Similarly, for sake of brevity, various assumptions may be made in the context of various examples (e.g., homogeneity of nodes in terms of resource capacity and homogeneity of units of compute in terms of the amount of resources needed), it is to be appreciated the scheduling and HA resource reservation algorithms described herein are equally applicable to heterogeneous nodes and heterogeneous units of compute. Finally, it is to be appreciated although one example of a cluster may be a distributed storage system in which each node represents a virtual storage system, the applicability of the methodologies described herein are not limited to any specific type of cluster.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below. A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a", "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability and mobility (e.g., cloud bursting for load balancing between clouds).

As used herein, the term "unit of compute" generally refers to the smallest execution unit managed by the computing environment at issue. Non-limiting examples of units of compute include processes, VMs, containers, and Kubernetes pods (which may be referred to simply as "pods"). In various examples described herein, a unit of compute is assumed to require a multiple of p resources for execution.

As used herein, the term "unit of HA reserve" generally refers to an amount (e.g., a multiple of p) of resource capacity reserved for failover of one or more specified units of compute.

As used herein, the "bursting" of a unit of compute generally refers to the ability of a unit of compute to consume more resources than requested for the unit of compute when excess resource capacity remains available on a given node, for example, due to the occurrence of fewer node failures than accommodated by the schedule. For example, in Kubernetes a resource request (e.g., one CPU core) may be made for containers in a pod along with a limit (e.g., four CPU cores), specifying the maximum amount of resources that can be consumed by the containers in the pod. In such a scenario, should the pod have a need for more than the requested one CPU core, it may be allowed to use up to four CPU cores from one or more units of HA reserve on the node unless or until there is a node failure and the resources associated with units of HA reserve are used for the failover of the units of compute after the node failure. Given that node failures are not frequent occurrences and that it is very likely that at any moment the number of actual node failures is fewer than the number of the expected node failures, the possibility for the units of compute to take advantage of the idle capacity that is reserved for HA failovers can greatly boost computational performance and cluster efficiency.

Example Operating Environment

Figure 3:
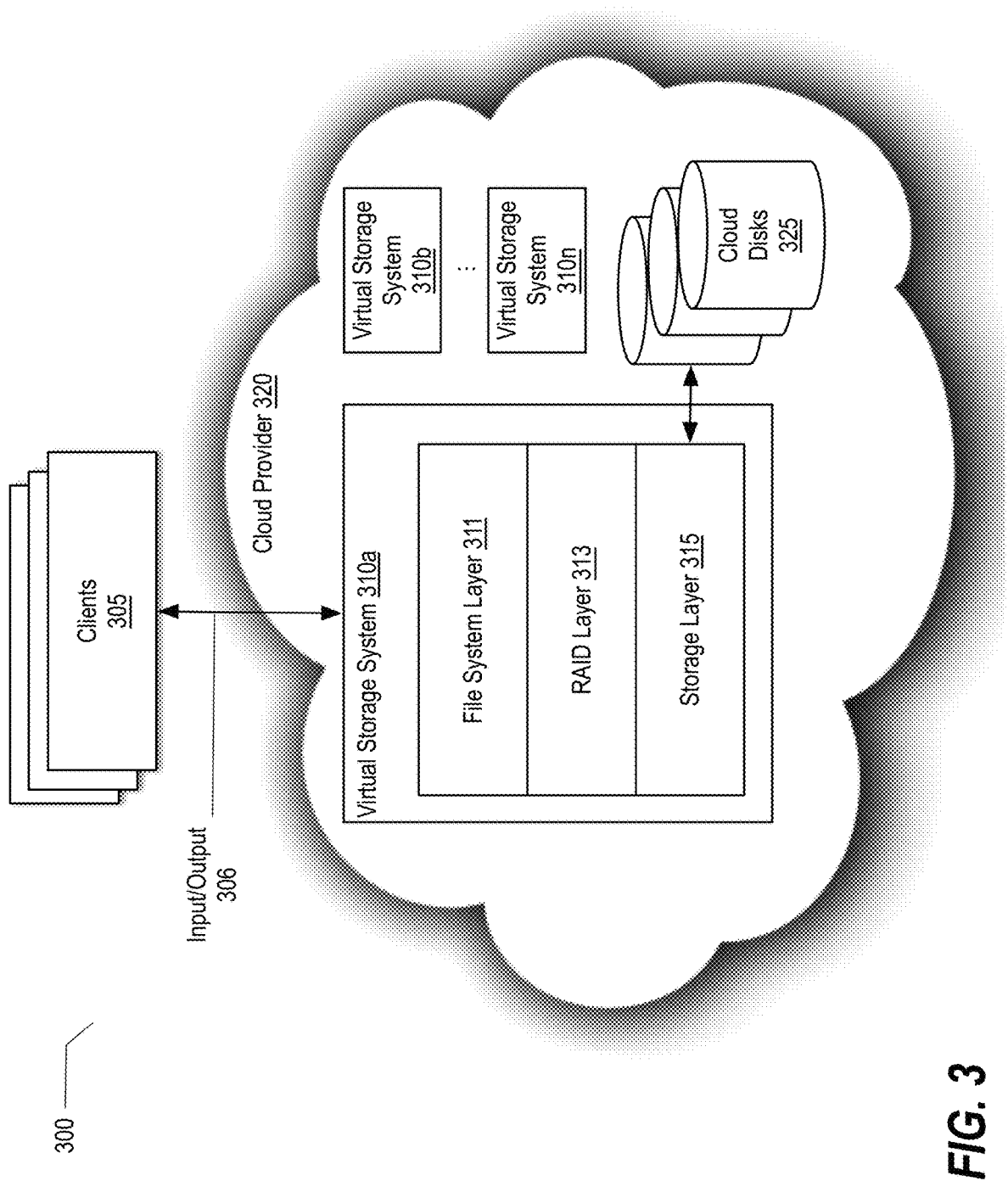
FIG. 3 is a block diagram illustrating an environment in which a unit of compute or multiple units of compute embody a virtual storage system in accordance with an embodiment of the present disclosure.

FIG. 3 is a block diagram illustrating an environment 300 in which a unit of compute or multiple units of compute embody a virtual storage system in accordance with an embodiment of the present disclosure. In various examples described herein, a virtual storage system 310a, which may be considered exemplary of virtual storage systems 310b-n, may be run (e.g., on a VM or as a containerized instance, as the case may be) within a public cloud provided by a public cloud provider (e.g., cloud provider 320). In the context of the present example, the virtual storage system 310a makes use of storage (e.g., cloud disks 325) provided by the cloud provider, for example, in the form of SSD backed or HDD backed disks. The cloud disks (which may also be referred to herein as cloud volumes, storage devices, or simply volumes or storage) may include persistent storage (e.g., disks) and/or ephemeral storage (e.g., local disks, memory-backed storage).

The virtual storage system 310a may present storage over a network to clients 305 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 305 may request services of the virtual storage system 310 by issuing Input/Output requests 306 (e.g., file system protocol messages (in the form of packets) over the network). A representative client of clients 305 may comprise an application, such as a database application, executing on a computer that "connects" to the virtual storage system 310 over a computer network, such as a point-to-point link, a shared local area network (LAN), a wide area network (WAN), or a virtual private network (VPN) implemented over a public network, such as the Internet.

In the context of the present example, the virtual storage system 310a is shown including a number of layers, including a file system layer 311 and one or more intermediate storage layers (e.g., a RAID layer 313 and a storage layer 315). These layers may represent components of data management software (not shown) of the virtual storage system 310. The file system layer 311 generally defines the basic interfaces and data structures in support of file system operations (e.g., initialization, mounting, unmounting, creating files, creating directories, opening files, writing to files, and reading from files). A non-limiting example of the file system layer 311 is the Write Anywhere File Layout (WAFL) Copy-on-Write file system (which represents a component or layer of ONTAP software available from NetApp, Inc. of San Jose, CA).

The RAID layer 313 may be responsible for encapsulating data storage virtualization technology for combining multiple cloud disks 325 into RAID groups, for example, for purposes of data redundancy, performance improvement, or both. The storage layer 315 may include storage drivers for interacting with the various types of cloud disks 325 supported by the cloud provider 320. Depending upon the particular implementation, the file system layer 311 may persist data to the cloud disks 325 using one or both of the RAID layer 313 and the storage layer 315.

The various layers described herein, and the processing described below with reference to the flow diagrams of FIGS. 4-6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 17 below.

Example Principles

For the sake of discussion, in various examples described herein, it is assumed each unit of compute requires p amount of resources and the cluster on which the units of compute are to be scheduled for execution includes n nodes, where each node has capacity c (i.e., a given node can host c units of compute or the given node has c×p amount of resources), and it is desirable to tolerate f node failures.

Non-limiting examples of principles underlying the proposed scheduling and HA resource reservation algorithm are as follows:

Assuming a desire to tolerate f node failures within a cluster, at least f×c capacity should be reserved for HA failovers. For example, in the context of FIG. 10 the reserved capacity is 2×8 =16 (the total number of units of HA reserve represented by the gray rectangles distributed throughout the cluster). In one embodiment, one responsibility of the algorithm is to distribute the f×c reserved capacity across all nodes of the cluster (as opposed to the reserved capacity being concentrated in f nodes as observed in the naive loosely coupled HA reservation implementation described above.

To tolerate f node failures, each unit of compute should map to f units of HA reserve. For example, in FIG. 10, unit of compute 1 maps to 2p HA reservation capacity, with one unit of HA reserve of size p in node 1010b and another unit of HA reserve in of size p in node 1010c.

The units of HA reserve within any node should not map to any unit of compute that is scheduled on the same node. This is because in the event of a node failure, it is desirable to have spare capacity for the units of compute to be available on other nodes, so the units of compute can migrate there. For example, in FIG. 10, the two units of HA reserve represented by gray rectangles 1011b and 1011f in node 1010a should not map to the units of compute 1, 13, 19, 25, 37, and 43 that are scheduled on that node.

The units of HA reserve should not map to two units of compute that are scheduled on the same node. This is because in the event of a node failure or multiple node failures, the same unit of HA reserve is not available to accommodate multiple units of compute. This means each unit of HA reserve should not hold more than (e.g., be mapped to or otherwise associated with) n−f units of compute. For example, in FIG. 10 each unit of HA reservation may be used by one of 8−2 =6 specified units of compute.

Figure 10:
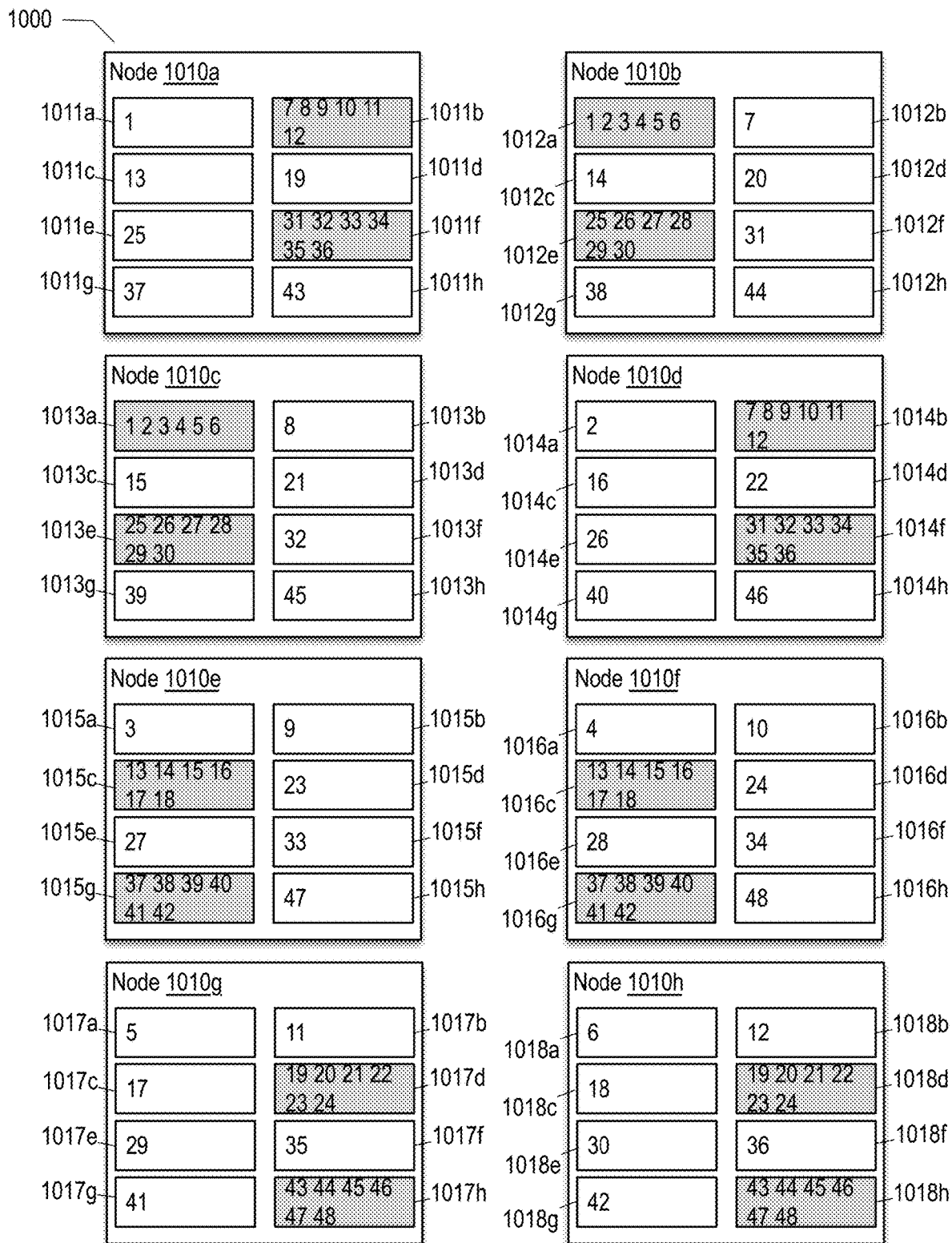
FIG. 10 is a block diagram illustrating an HA model for tolerating failure of any two nodes in an eight-node cluster in accordance with an embodiment of the present disclosure.

In one embodiment, to ensure correctness and support the failure off arbitrary nodes, each HA reservation should be replicated f times across different nodes (subject to other constraints described above). In FIG. 10, it can be seen that each unit of HA reserve has a replica in another node. For example, the unit of HA reserve for HA reservation {1, 2, 3, 4, 5, 6}) maps to nodes 1010b and 1010c. In such an embodiment, the fact that HA reservations are replicated f times also simplifies the failover algorithm as irrespective of which f nodes have failed, the failover algorithm will not encounter a situation in which units of HA reserve are not able to accommodate the units of compute being migrated from the failed node. Therefore, upon a node failure, a given unit of compute previously executed by the failed node can move to any of the units of HA reserve with which it is associated with no requirement for global coordination to be performed across units of compute or nodes.

More formally, upon the failure of a given node $n_i$, all units of compute $uc_i$ whose primary node is $n_i$ migrate to other nodes where reserved capacity has previously been set aside or otherwise earmarked for the $uc_i$ failover. Given that HA reservations are mirrored and no $uc_i$ and $uc_j$ whose primary node is $n_i$ map to the same HA reservation, $p_i$ can failover to any of the HA reservations that have been associated with $p_i$ without causing any conflicts at that time or upon the next f−1 node failures, if and when they occur.

When nodes are homogeneous, the above principles provide for an optimal scheduling and HA resource reservation algorithm as it reserves the minimal capacity for HA (f×c) while also maximizing the available burst capacity for units of compute by spreading the HA reserve across many nodes (also f×c). The above principles also ensure correctness even when nodes and/or units of compute are heterogeneous as illustrated with reference to the examples of FIGS. 12-14.

Example Equations

When nodes and units of compute are homogeneous (i.e., each node is of the same size c and each unit of compute requires p resources), equations (EQ #1 and EQ #2) below may be used to determine the maximum number of the units of compute that can be accommodated (u) and the maximum units of HA reserve to be allocated (h) to tolerate f failures when each node has capacity c units of compute or HA reserve and there are n nodes in the cluster. The math generally reflects the fact that, in accordance with one embodiment, the algorithm tries to spread both units of compute and units of HA reserve across as many nodes of a cluster as possible.

$$u = c \times (n-f) \quad \text{EQ \#1}$$

$$h = (u \times f)/(n-f) \quad \text{EQ \#2}$$

Once u and h are known, there is also an equation (i.e., EQ #3) for efficiency (e), which is the ratio of the total capacity used for scheduling units of compute (i.e., not used for units of HA reserve) relative to the capacity of the cluster (n×c or u+h). It is also worth noting h×p, which is equal to c×f is the burst capacity or the additional compute capacity relative to the naive loosely coupled HA reservation implementation.

$$e = u/(u+h) \quad \text{EQ \#3}$$

The above equations (EQ #1-2 are derived from the following equation:

$$n \times c = u + h \quad \text{EQ \#4}$$

where, h is a function of u as each unit of HA reservation can map to at most n f units of compute and to tolerate f failures, u/(n−f)×f units of HA reservation are needed in total. Substituting (u×f)/(n−f) for h in EQ #4 yields:

$$n \times c = u + u \times f/(n-f)$$
$$= u \times (1 + f/(n-f))$$
$$= u \times (n - f + f)/(n-f)$$
$$= u \times n/(n-f) => u$$
$$= c \times (n - f)$$

Example Scheduling Processing

Figure 4:
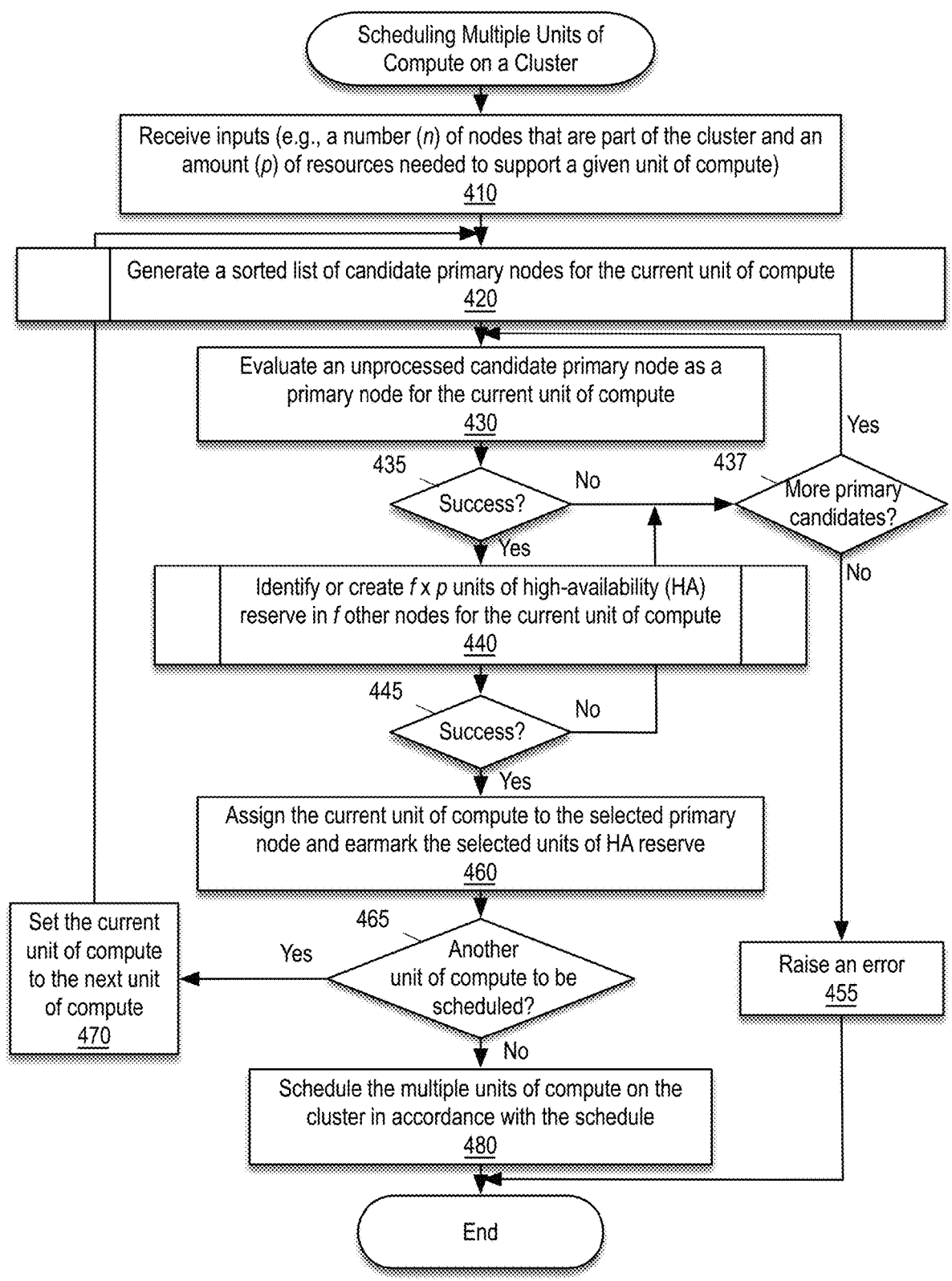
FIG. 4 is a flow diagram illustrating operations for performing scheduling of multiple units of compute on a cluster in accordance with an embodiment of the present disclosure.

FIG. 4 is a flow diagram illustrating operations for performing scheduling of multiple units of compute on a cluster in accordance with an embodiment of the present disclosure. The processing described with reference to FIG. 4 represents a non-limiting example of a scheduling algorithm that may be performed by a default or custom scheduler associated with a container orchestration platform (e.g., Kubernetes). The scheduler may be part of a control plane of a given cluster (e.g., an HA cluster including, for example, nodes in the form of virtual storage systems 310a-n) and may be responsible for assigning units of compute to nodes of the cluster. The scheduler may also be responsible for implementing an improved HA resource reservation approach that reserves resource capacity to tolerate a desired number of concurrent node failures (f) while also accommodating bursting by the units of compute, for example, by distributing the reserved capacity across the cluster. In one embodiment, the number (f) of concurrent node failures to be tolerated by the cluster may be derived or otherwise assumed based on any of a variety of approaches (e.g., a mean time between failures (MTBF) and/or a mean time to failure (MTTF) analysis).

At block 410, inputs to the scheduling algorithm are received. The inputs may include a number (n) of nodes that are part of the cluster, a number of concurrent node failures (f) to be accommodated, and an amount (p) of resources needed to support a given unit of compute. For example, in the context of Kubernetes, the number of nodes in the Kubernetes cluster (n) and the amount of CPU and memory resources requested by a pod (p), which is specified as part of the pod definition, are already factored in by the default scheduler for the pod scheduling decisions. By using a custom Kubernetes scheduler to also factor in the number of concurrent node failures (f), passed as a Kubernetes ConfigMap field or a boot argument or dynamically calculated based on (n) and MTBF, the custom Kubernetes scheduler can arrive at node assignments for units of compute and units of HA reserve.

The scheduler may then loop through a set of multiple units of compute to be scheduled for execution on the cluster until all of the units of compute have been scheduled or until insufficient resources exist within the cluster to schedule an additional unit of compute.

At block 420, a sorted list of candidate primary nodes is generated for the current unit of compute. A primary node for a given unit of compute represents the node of the cluster on which the given unit of compute will be scheduled for execution. In contrast, a secondary node for a given unit of compute is a node that has sufficient HA reservation capacity set aside to accommodate the migration of the given unit of compute should the primary node fail. In one embodiment, the sorting may involve application of a predetermined or configurable sorting criterion to determine the ordering of the candidate primary nodes. A non-limiting example of generation of a sorted list of candidate primary nodes for the current unit of compute is described further below with reference to FIG. 5.

After the sorted list of candidate primary nodes has been generated, an iterative approach may be performed to determine an appropriate combination of a primary node and secondary nodes for the unit of compute. At block 430 an unprocessed candidate primary node is evaluated for use as the primary node for the current unit of compute. In one embodiment, assuming the sorting criterion used in block 420 to generate the sorted list of candidate primary nodes is the only criterion, the next unprocessed candidate primary node in the sorted list may be selected. Alternatively, if there are one or more other criteria desired to select among the candidate primary nodes they may be applied here.

At decision block 435, it is determined whether selection of a candidate primary node was successful. If so, processing continues with block 440; otherwise, processing branches to decision block 437.

At decision block 437, it is determined whether there is another candidate primary node to be evaluated. If so, processing loops back to block 430; otherwise, processing branches to block 455.

At block 440, f×p units of HA reserve in f other nodes (secondary nodes) are identified or created (allocated) for the current unit of compute. In this manner f−1 additional arbitrary node failures may be accommodated in addition to the failure of the primary node. In one embodiment, the approach for distributing resource capacity reserved for HA among the nodes may take into consideration those nodes currently having the most available resource capacity and/or the least amount of resource capacity reserved for purposes of HA. A non-limiting example of an approach for identifying units of HA reserve is described further below with reference to FIG. 6.

At block 445, it is determined whether the combination of the selected candidate primary node and HA reservations among the secondary nodes was successful. If so, processing continues with block 460; otherwise, processing branches to decision block 437.

At block 460, a satisfactory combination of a primary node for the current unit of compute and secondary nodes having units of HA reserve to which the current unit of compute can be mapped has been identified. At this point, the current unit of compute is assigned to the primary node (selected in block 430) and the units of HA reserve (identified or newly created in block 440) are earmarked, for example, by associating the ID of the unit of compute with the units of HA reserve. In one embodiment, the schedule may maintain one or more data structures to track various metrics and assignments of units of compute. For example, the scheduler may maintain a schedule identifying for each node, the units of compute that have been assigned to be executed on the node, the amount of resource capacity associated with HA reservations, the remaining resource capacity, the state of the node's existing units of HA reserve (e.g., which have been earmarked for a given unit of compute and how many units of execution currently map to each of the existing units of HA reserve), and the units of compute for which HA reservations have been made on the node.

At decision block 465, a determination is made regarding whether another unit of compute remains to be scheduled. If so, processing branches to block 470 at which the current unit of compute is set to the next unit of compute and processing loops back to block 420; otherwise, scheduling is complete and processing continues with block 480.

At block 480, the multiple units of compute are scheduled for execution on the cluster in accordance with the schedule established by blocks 420-470.

Example Generation of a Candidate Primary Node List

Figure 5:
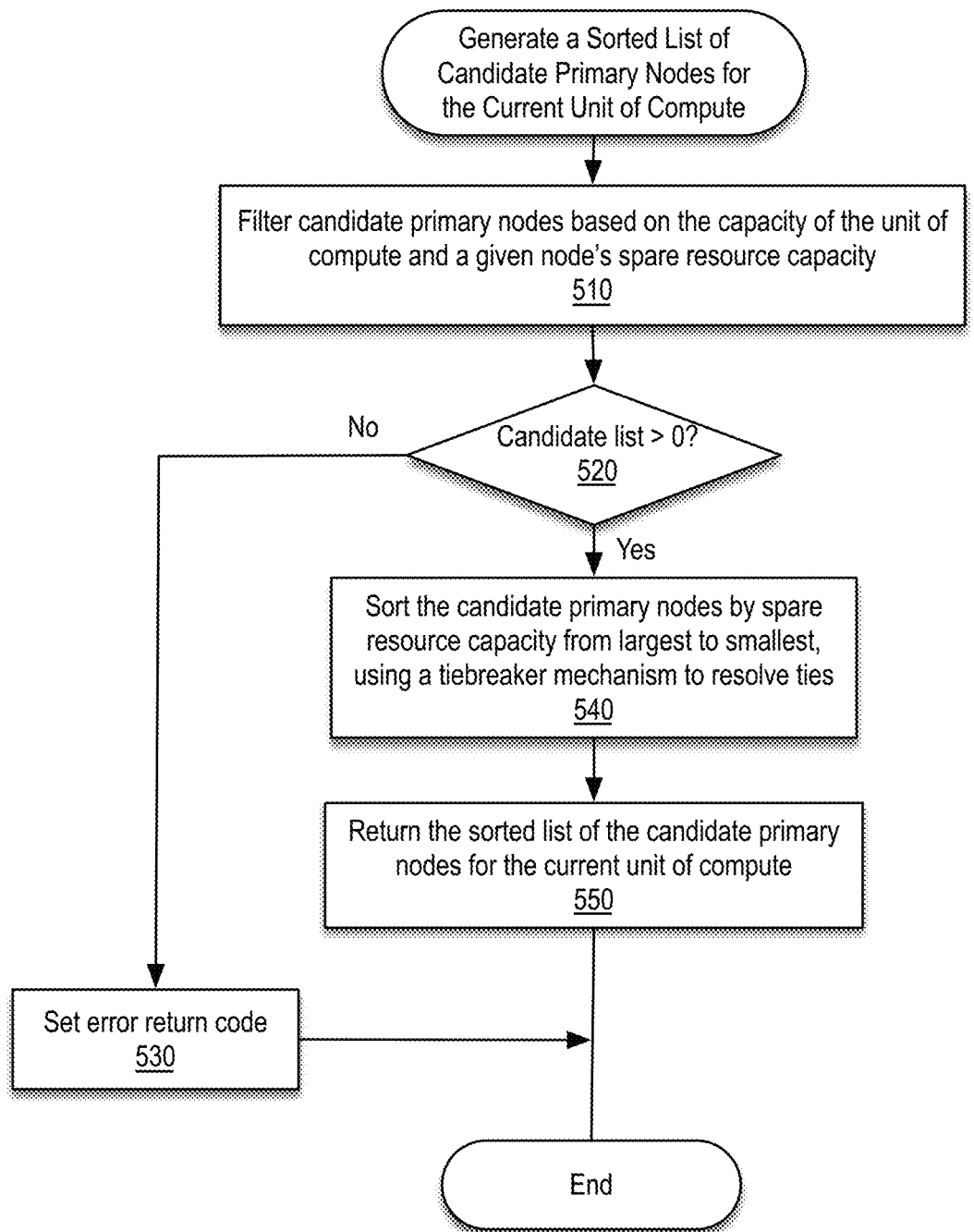
FIG. 5 is a flow diagram illustrating operations for generating a sorted list of candidate primary nodes for the current unit of compute in accordance with an embodiment of the present disclosure.

FIG. 5 is a flow diagram illustrating operations for generating a sorted list of candidate primary nodes for the current unit of compute in accordance with an embodiment of the present disclosure. The processing described with reference to FIG. 5 represents a non-limiting example of the generation of a sorted list of candidate primary nodes that may be performed by block 420 of FIG. 4.

At block 510, the nodes of the HA cluster are filtered to exclude those unable to accommodate the current unit of compute. In one example, the list of candidate primary nodes may start with all nodes of the cluster and then the list may be filtered to exclude those of the nodes that do not have spare resource capacity greater than or equal to the amount (p) of resources required to execute the current unit of compute. For example, in the context of Kubernetes, those nodes of the Kubernetes cluster having less than the amount of CPU and memory resources requested by a pod (p), which is specified as part of the pod definition, are excluded from the list of candidate primary nodes.

At decision block 520, it is determined whether the list of candidate primary nodes for the current unit of compute includes at least one node. If not, processing branches to block 530 in which an error return code may be set; otherwise, processing continues with block 540.

At block 540, the list of candidate primary nodes is sorted in decreasing order based on candidate nodes' respective remaining spare capacity (e.g., the total resource capacity of the node (c) minus all the resource capacity that is allocated to the primary units of compute (those units of compute for which the node represents the primary node) and HA reservations). If there is a tie during the sorting process (e.g., more than one candidate primary node has the same spare resource capacity), then a tiebreaker may be performed to prioritize between or among them. In one embodiment, the number of the primary units of compute on a given node may be used as a tiebreaker with preference given to the node with fewer primary units of compute. If multiple nodes have the same spare resource capacity and the same number of primary units of compute, by convention, preference may then be given based on the node ID. For example, the node with the higher ID may be selected or the node with the lower ID may be selected.

At block 550, the sorted list of candidate primary nodes is returned

While in the context of the present example, the largest available resource capacity is used as the principal sorting factor among the candidate primary nodes, it is to be appreciated various alternative metrics may be employed to order the candidate nodes. For example, in alternative embodiments, the candidate nodes may be sorted based on the ratio of a given node's total capacity to that which has been set aside on the node for HA reservations, or the candidate nodes may be sorted based on those that are less likely to fail (e.g., nodes with higher MTBF and MTTF rates)

Example Selection of Units of HA Reserve

Figure 6:
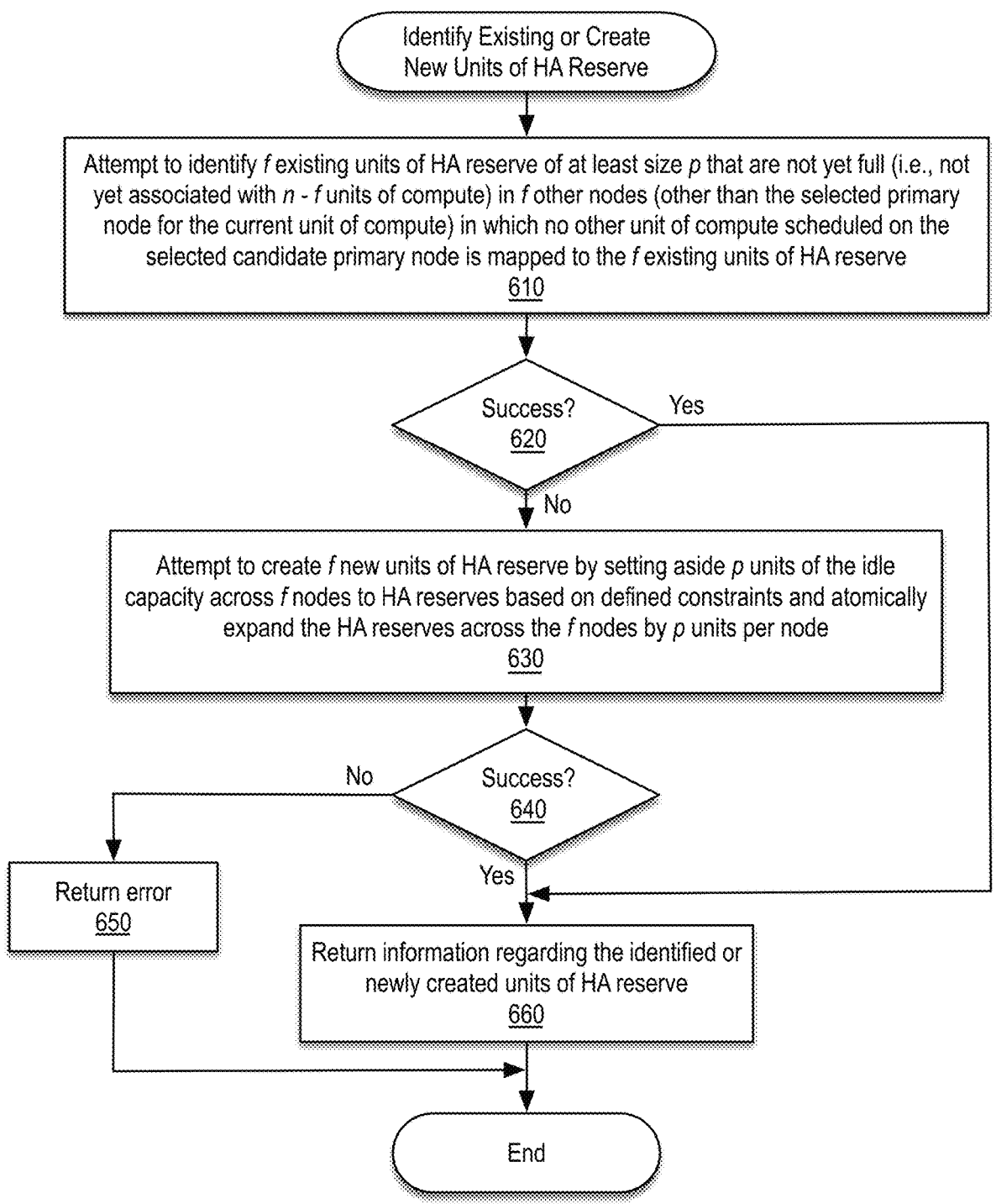
FIG. 6 is a flow diagram illustrating operations for performing identification and/or creation of units of HA reserve in accordance with an embodiment of the present disclosure.

FIG. 6 is a flow diagram illustrating operations for performing identification and/or creation of units of HA reserve in accordance with an embodiment of the present disclosure. The processing described with reference to FIG. 6 represents a non-limiting example of selecting units of HA reserve that may be performed by block 440 of FIG. 4. In the context of the present example, the approach for identifying nodes for units of HA reserve is intended to prioritize the use of nodes in the cluster that have available allocated HA reserve capacity (i.e., an existing unit of HA reserve to which fewer than n−f units of compute are mapped) over those nodes that do not have available allocated HA reserve capacity. Such an approach represents a greedy algorithm that tries to maximize the use of existing HA reserves and minimizes the total capacity reserved for HA.

At block 610, an attempt is made to identify f units of HA reserve of at least size p (those units of HA reserve previously created (in block 630) that are not yet full) in f other nodes (other than the selected candidate primary node for the current unit of compute) in which no other unit of compute scheduled on the selected candidate primary node is mapped to the f units of HA reserve. Among those nodes having available HA reserves, the nodes may be prioritized as follows: (i) first, the nodes that have lower HA reserves; (ii) second the nodes that have fewer units of HA reserve assigned to units of compute whose primary node is also the primary node of the current unit of compute; and (iii) finally, if everything else is equal, by convention, units of HA reserve may be selected from the f nodes having the lowest IDs or alternatively the highest IDs.

At decision block 620, it is determined if the identification of the units of HA reserve attempted in block 610 was successful. If not, processing continues with block 630; otherwise, processing branches to block 660. The lack of availability of existing units of HA reserve may be as a result of all existing units of HA reserve being full (e.g., n−f units of compute are already associated with each existing unit of HA reserve or as a result of no units of HA reserve having yet been allocated (e.g., this is a new cluster on which units of compute are being scheduled).

At block 630, an attempt is made to create/allocate f new units of HA reserve by setting aside the f units of HA reserve across f nodes of the cluster for HA reserves, for example, based on the constraints noted above with reference to block 610. In order to tolerate f node failures, the HA reservations are atomically expanded across the f nodes by one unit of capacity p per node (fxp capacity across the cluster). In one embodiment, the HA reservations that are allocated atomically will remain mirrors of each other for the duration of the algorithm to simplify failover as described above.

At decision block 640, it is determined whether identification or creation (as the case may be) of the desired number of units of HA reserve was successful. If so, processing continues with block 660; otherwise processing branches to 650 in which an error is returned.

At block 660, information regarding the identified or newly created/allocated (as the case may be) units of HA reserve are returned.

While in the context of the examples described with reference to the flow diagrams of FIGS. 4-6, a number of enumerated blocks are included, it is to be understood that examples may include additional blocks before, after, and/or in between the enumerated blocks. Similarly, in some examples, one or more of the enumerated blocks may be omitted and/or performed in a different order.

Example HA Models

In clusters having more than two nodes, the proposed scheduling and HA resource reservation algorithm outperforms both the naive tightly coupled HA reservation implementation and the naive loosely coupled HA reservation implementation. Furthermore, as the cluster size increases, both the efficiencies and outperformance become even greater. For purposes of illustration, the following example HA models demonstrate the results of the proposed scheduling and HA resource reservation algorithm in accordance with various embodiments in a variety of circumstances, including different cluster sizes, different node failure tolerances, clusters of homogeneous nodes, clusters of heterogeneous nodes, scheduling and HA resource reservation of homogeneous units of compute, and scheduling and HA resource reservation of heterogeneous units of compute.

Figure 7:
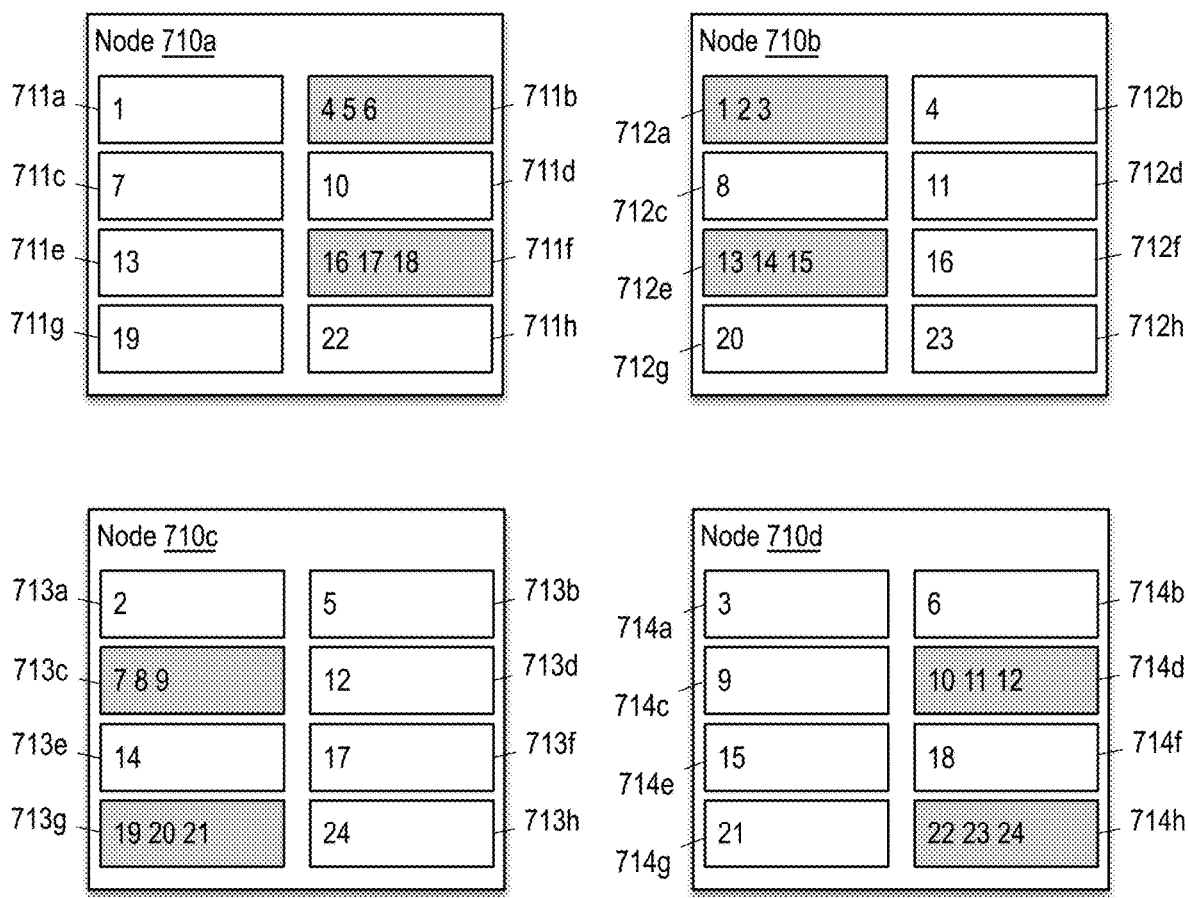
FIG. 7 is a block diagram illustrating an HA model for tolerating a single-node failure in a four-node cluster in accordance with an embodiment of the present disclosure.

FIG. 7 is a block diagram illustrating an HA model for tolerating a single-node failure in a four-node cluster 700 in accordance with an embodiment of the present disclosure. As in the prior examples, the rectangles having a white background within nodes 710a-d represent resource capacity that is scheduled for utilization by units of compute, whereas the rectangles having a gray background each represent a unit of HA reserve for supporting failover of a unit of compute from an unhealthy node.

In the context of the present example, node 710a includes rectangles 711a-h, two of which represent HA reservations (i.e., (i) rectangle 711b, which has a unit of HA reserve that can be used to bring up any of units of compute 4, 5, or 6 should one of nodes 710b-d fail and (ii) rectangle 711f, which has a unit of HA reserve that can be used for any of units of compute 16, 17, or 18 should one of nodes 710b-d fail).

Node 710b includes rectangles 712a-h, two of which represent HA reservations (i.e., (i) rectangle 712a, which has a unit of HA reserve that can be used to bring up any of units of compute 1, 2, or 3 should one of nodes 710a or 710c-d fail and (ii) rectangle 712e, which has a unit of HA reserve that can be used for any of units of compute 13, 14, or 15 should one of nodes 710a, or 710c-d fail).

Node 710c includes rectangles 713a-h, two of which represent HA reservations (i.e., (i) rectangle 713c, which has a unit of HA reserve that can be used to bring up any of units of compute 7, 8, or 9 should one of nodes 710a-b or 710d fail and (ii) rectangle 713g, which has a unit of HA reserve that can be used for any of units of compute 19, 20, or 21 should one of nodes 710a-b or 710d fail).

Node 710d includes rectangles 714a-h, two of which represent HA reservations (i.e., (i) rectangle 714d, which has a unit of HA reserve that can be used to bring up any of units of compute 10, 11, or 12 should one of nodes 710a-c fail and (ii) rectangle 714h, which has a unit of HA reserve that can be used for any of units of compute 22, 23, or 24 should one of nodes 710a-c fail).

For purposes of illustration, assume node 710b fails. This means units of compute 4, 8, 11, 16, 20, and 23 need to be migrated to a new node. With the illustrated assignment, units of compute 4 and 16 land on node 710a, units of compute 8 and 20 land on node 710c, and units of compute 11 and 23 land on node 701d.

As can be seen the scheduling of the 24 units of compute and reservation of capacity for HA failover across the cluster 700 maintains two properties:
  The reserved capacity for HA failover is uniformly distributed across all nodes when nodes and units of compute are of the same size; and
  No two units of compute from the same node map to the same rectangle (HA reservation).

As noted above and as can be observed with reference to FIG. 7, when the nodes of a cluster are homogeneous, the example principles provide for an optimal scheduling and HA resource reservation algorithm as it reserves the minimal capacity for HA (fxc) while also maximizing the available burst capacity for units of compute by spreading the HA reserve across many nodes (also fxc).

In this example, the gray rectangles that represent the reserved capacity to tolerate HA failovers, only consume 25% of the total capacity. Therefore, unlike a corresponding naive tightly coupled HA reservation implementation, which would have required 6 nodes to host 24 pods, as it has 50% efficiency, the proposed approach achieves 75% efficiency. Notably, assuming each node can accommodate 8 units of compute, 6 nodes would have the capacity for 48 units of compute; however, due to the 50% utilization restriction they can only accommodate 24 units of compute. As such, another way to compare the optimal algorithm with the naive tightly coupled HA reservation implementation is that with the proposed algorithm 24 units of compute can be scheduled on 4 nodes as compared to 6 nodes as required by the naive tightly coupled HA reservation implementation. In dollar terms, the proposed approach saves the cost of 2 nodes, which represents a 33.33% savings.

Referring back to EQ #1-3, the HA model for tolerating a single-node failure in cluster 700 results in u, h, and e values as follows:

$$u=8\times(4-1)=24$$

$$h=(24\times1)/(4-1)=8$$

$$e=24/32=0.75$$

Figure 8:
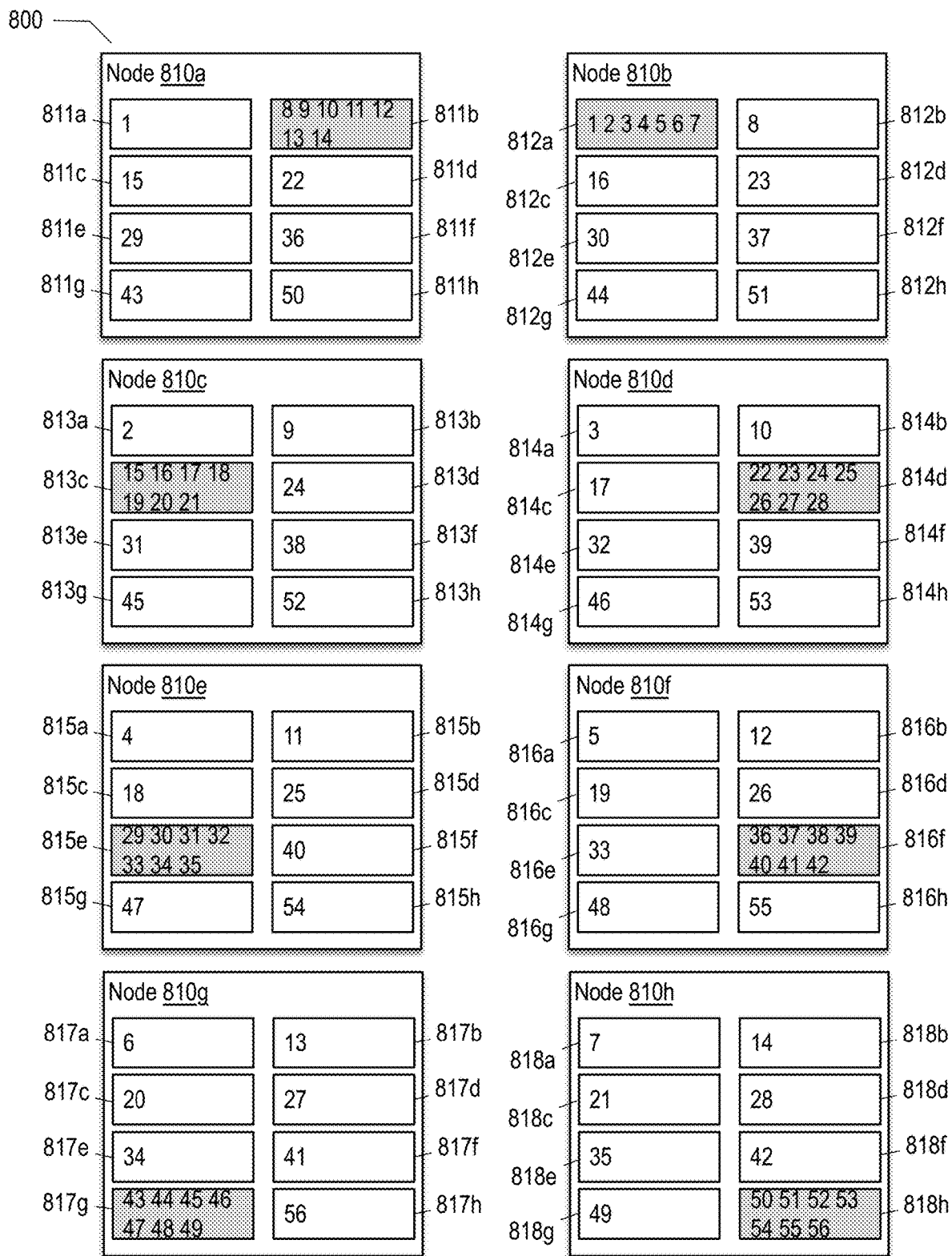
FIG. 8 is a block diagram illustrating an HA model for tolerating a single-node failure in an eight-node cluster in accordance with an embodiment of the present disclosure.

FIG. 8 is a block diagram illustrating an HA model for tolerating a single-node failure in an eight-node cluster 800 in accordance with an embodiment of the present disclosure. As in the prior examples, the rectangles having a white background within nodes 810*a-h* represent resource capacity that is scheduled for utilization by units of compute, whereas the rectangles having a gray background each represent a unit of HA reserve for supporting failover of a unit of compute from an unhealthy node.

In the context of the present example, node 810*a* includes rectangles 811*a-h*, one of which represents an HA reservation (i.e., rectangle 811*b*, which has a unit of HA reserve that can be used to bring up any of units of compute 8, 9, 10, 11, 12, 13, or 14 should one of nodes 810*b-h* fail.

Node 810*b* includes rectangles 812*a-h*, one of which represents an HA reservation (i.e., rectangle 812*a*, which has a unit of HA reserve that can be used to bring up any of units of compute 1, 2, 3, 4, 5, 6, or 7 should one of nodes 810*a* or 810*c-h* fail.

Node 810*c* includes rectangles 813*a-h*, one of which represents an HA reservation (i.e., rectangle 813*c*, which has a unit of HA reserve that can be used to bring up any of units of compute 15, 16, 17, 18, 19, 20, or 21 should one of nodes 810*a-b* or 810*d-h* fail.

Node 810*d* includes rectangles 814*a-h*, one of which represents an HA reservation (i.e., rectangle 814*d*, which has a unit of HA reserve that can be used to bring up any of units of compute 22, 23, 24, 25, 26, 27, or 28 should one of nodes 810*a-c* or 810*e-h* fail.

Node 810*e* includes rectangles 815*a-h*, one of which represents an HA reservation (i.e., rectangle 815*e*, which has a unit of HA reserve that can be used to bring up any of units of compute 29, 30, 31, 32, 33, 34, or 35 should one of nodes 810*a-d* or 810*f-h* fail.

Node 810*f* includes rectangles 816*a-h*, one of which represents an HA reservation (i.e., rectangle 816*f*, which has a unit of HA reserve that can be used to bring up any of units of compute 36, 37, 38, 39, 40, 41, or 42 should one of nodes 810*a-e* or 810*g-h* fail.

Node 810*g* includes rectangles 817*a-h*, one of which represents an HA reservation (i.e., rectangle 817*g*, which a unit of HA reserve that can be used to bring up any of units of compute 43, 44, 45, 46, 47, 48, or 49 should one of nodes 810*a-f* or 810*h* fail.

Node 810*h* includes rectangles 818*a-h*, one of which represents an HA reservation (i.e., rectangle 818*h*, which has a unit of HA reserve that can be used to bring up any of units of compute 50, 51, 52, 53, 54, 55, or 56 should one of nodes 810*a-g* fail.

As this example illustrates, as the clusters get larger, the proposed algorithm yields better efficiency. Here, the optimal algorithm reserves ⅛ of the total capacity for HA failovers; hence 87.5% efficiency is achieved as compared to 50% for the naïve tightly coupled HA reservation implementation when no failure happens. The proposed approach also allows the hosting of 56 units of compute using 8 nodes. To host 56 units of compute with the naïve tightly coupled HA reservation implementation, 14 nodes (56×2/8=14) would have been required. Therefore, the proposed approach saves 42.86% by using 8 nodes instead of 14. Relative to the naive loosely coupled HA reservation implementation, the proposed algorithm results in a burst capacity that is equivalent to one node.

Referring back to EQ #1-3, the HA model for tolerating a single-node failure in cluster 800 results in u, h, and e values as follows:

$$u=8\times(8-1)=56$$

$$h=(56\times1)/(8-1)=8$$

$$e=56/64=0.875$$

The same logic applies to scenarios where a service needs to tolerate more than one node failure. For example, the naive tightly coupled HA reservation implementation requires 6 nodes (if each node has two HA partners) to schedule 16 pods for it to tolerate any 2 nodes going down. The main limitation with the legacy HA implementations is that a storage controller is physically linked to a limited set of controllers (e.g., two other controllers to tolerate two node failures) and partner drives, and as a result it cannot take over for an arbitrary controller during a failover. This limitation mainly comes from the legacy HA implementations where a storage controller is physically linked to a limited set of controllers and partner drives and cannot take over for an arbitrary controller during a failover. By contrast, in various embodiments of the proposed algorithm or the naive loosely coupled HA reservation implementation, the HA reservation is somewhat fluid and can accommodate different nodes failing.

FIG. 9 is a block diagram illustrating an HA model for tolerating failure of any two nodes in a four-node cluster 900 in accordance with an embodiment of the present disclosure. As in the prior examples, the rectangles having a white background within nodes 910*a-d* represent resource capacity that is scheduled for utilization by corresponding units of compute, whereas the rectangles having a gray background each represent a unit of HA reserve for supporting failover of a unit of compute from an unhealthy node.

In the context of the present example, node 910*a* includes rectangles 911*a-h*, four of which represent HA reservations (i.e., (i) rectangle 911*b*, which has a unit of HA reserve that can be used to bring up either unit of compute 3 or 4 should one of nodes 910*b-c* fail, (ii) rectangle 911*d*, which has a unit of HA reserve that can be used to bring up either unit of compute 7 or 8 should one of nodes 910*b-c* fail, (iii) rectangle 911*f*, which has a unit of HA reserve that can be used to bring up either unit of compute 11 or 12 should one of nodes 910*b-c* fail, and (iv) rectangle 911*h*, which has a unit of HA reserve that can be used to bring up either unit of compute 15 or 16 should one of nodes 910*b-c* fail).

Node 910*b* includes rectangles 912*a-h*, four of which represent HA reservations (i.e., (i) rectangle 912*a*, which has a unit of HA reserve that can be used to bring up either unit of compute 1 or 2 should one of nodes 910*a* or 910*d* fail, (ii) rectangle 912*c*, which has a unit of HA reserve that can be used to bring up either unit of compute 5 or 6 should one of nodes 910*a* or 910*d* fail, (iii) rectangle 912*e*, which has a unit of HA reserve that can be used to bring up either unit of compute 9 or 10 should one of nodes 910*a* or 910*d* fail, and (iv) rectangle 912*g*, which has a unit of HA reserve that can be used to bring up either unit of compute 13 or 14 should one of nodes 910*a* or 910*d* fail).

Node 910*c* includes rectangles 913*a-h*, four of which represent HA reservations (i.e., (i) rectangle 913*a*, which has a unit of HA reserve that can be used to bring up either unit of compute 1 or 2 should one of nodes 910*a* or 910*d* fail, (ii) rectangle 913*c*, which has a unit of HA reserve that can be used to bring up either unit of compute 5 or 6 should one of nodes 910*a* or 910*d* fail, (iii) rectangle 913*e*, which has a unit of HA reserve that can be used to bring up either unit of compute 9 or 10 should one of nodes 910*a* or 910*d* fail, and (iv) rectangle 913*g*, which has a unit of HA reserve that can be used to bring up either unit of compute 13 or 14 should one of nodes 910*a* or 910*d* fail).

Node 910*d* includes rectangles 914*a-h*, four of which represent HA reservations (i.e., (i) rectangle 914*b*, which has a unit of HA reserve that can be used to bring up either unit of compute 3 or 4 should one of nodes 910*b-c* fail, (ii) rectangle 914*d*, which has a unit of HA reserve that can be used to bring up either unit of compute 7 or 8 should one of nodes 910*b-c* fail, (iii) rectangle 914*f*, which has a unit of HA reserve that can be used to bring up either unit of compute 11 or 12 should one of nodes 910*b-c* fail, and (iv) rectangle 914*h*, which has a unit of HA reserve that can be used to bring up either unit of compute 15 or 16 should one of nodes 910*b-c* fail).

Figure 9A:
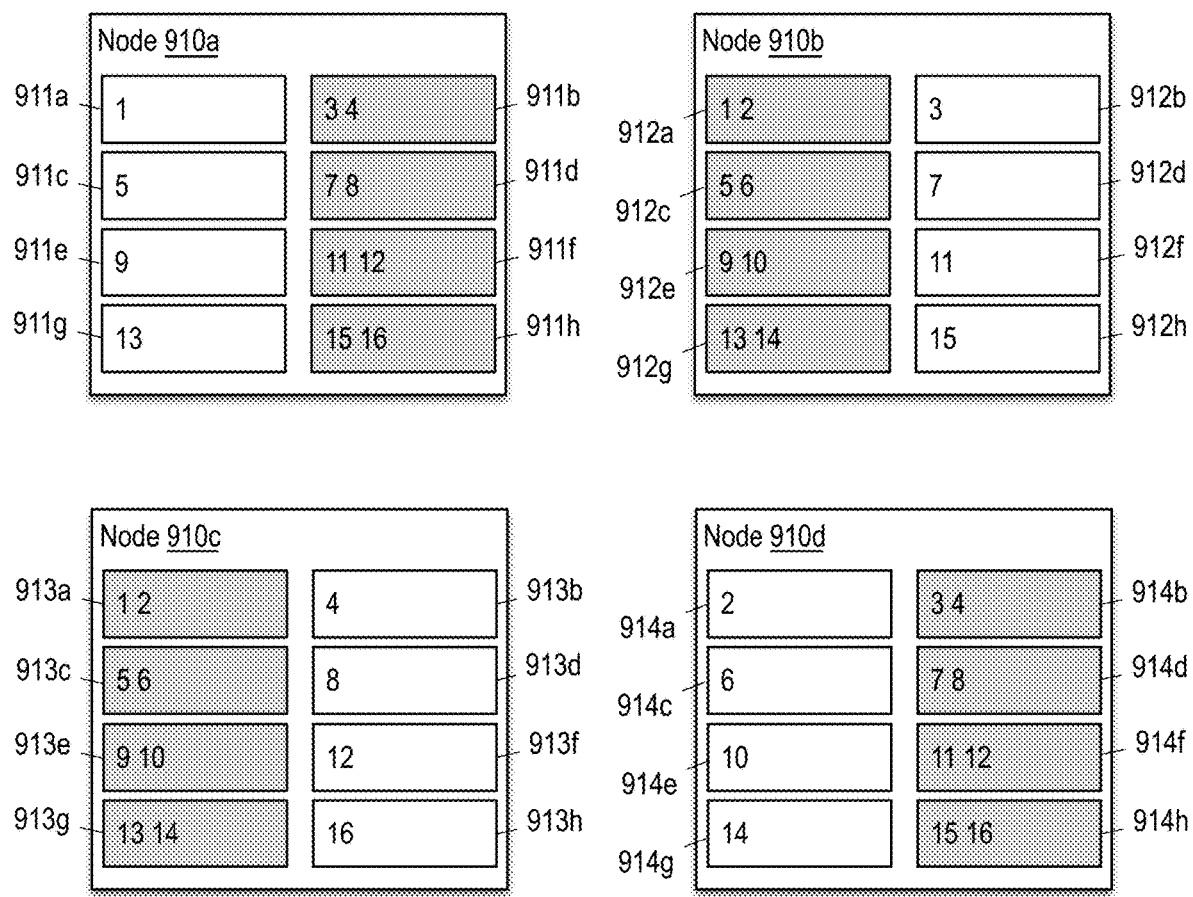
FIG. 9A is a block diagram illustrating an HA model for tolerating failure of any two nodes in a four-node cluster in accordance with an embodiment of the present disclosure.

As can be seen in FIG. 9A, there are two units of HA reserve corresponding to each HA reservation (mirrored HA reservations), thereby simplifying failover in the event of a two-node failure as described above. Compared to the naïve tightly coupled HA reservation implementation, which is limited to 33% efficiency when each node has two HA partners, the proposed algorithm achieves 50% efficiency. Moreover, the proposed algorithm schedules 16 pods using only 4 nodes (representing a 33% savings over the naïve tightly coupled HA reservation implementation that requires 6 nodes to schedule 16 pods when each node has two HA partners).

Figure 9B:
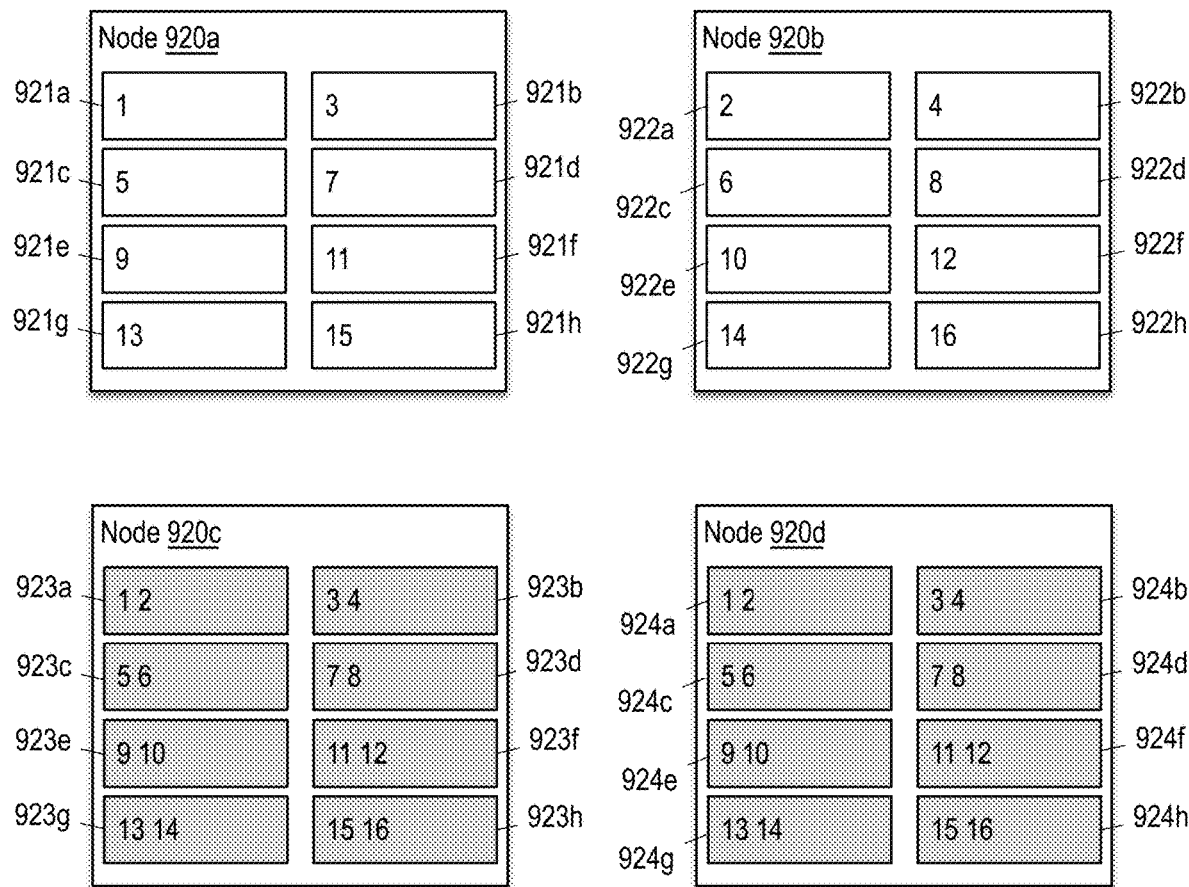
FIG. 9B is a block diagram illustrating system utilization in the context of a naïve loosely coupled HA reservation implementation.

As can be seen with reference to FIG. 9B, which is a block diagram illustrating system utilization in the context of a naïve loosely coupled HA reservation implementation, all units of compute are consolidated in white rectangles 921*a-h* and 922*a-h* of node 920*a* and node 920*b*, respectively; and all HA reserve capacity is consolidated in the gray rectangles 923*a-h* and 924*a-h* of node 920*c* and node 920*d*, respectively.

The proposed algorithm achieves the same efficiency as the naïve loosely coupled HA reservation implementation as illustrated by FIG. 9B; however, by distributing the HA reservations across the nodes, the proposed approach allows a service to burst up to the capacity of 16 pods (effectively doubling the compute capacity) when no failures happen or 8 pods when a single failure happens as compared to zero capacity to burst in the context of the naive loosely coupled HA reservation implementation.

Referring back to EQ #1-3, the HA model for tolerating two node failures in cluster 900 results in u, h, and e values as follows:

$$u=8\times(4-2)=16$$

$$h=(16\times2)/(4-2)=16$$

$$e=16/(16+16)=0.5$$

The benefits of the proposed algorithm are even more evident when there are 8 nodes and there is a desire to tolerate 2 node failures as shown in FIG. 10.

FIG. 10 is a block diagram illustrating an HA model for tolerating failure of any two nodes in an eight-node cluster 1000 in accordance with an embodiment of the present disclosure. As in the prior examples, the rectangles having a white background within nodes 810*a-h* represent resource capacity that is scheduled for utilization by units of compute, whereas the rectangles having a gray background each represent a unit of HA reserve for supporting failover of a unit of compute from an unhealthy node.

In the context of the present example, node 1010*a* includes rectangles 1011*a-h*, two of which represent HA reservations (i.e., (i) rectangle 1011*b*, which has a unit of HA reserve that can be used to bring up any of units of compute 7, 8, 9, 10, 11, or 12 should one of nodes 1010*b-c* or 1010*e-g* fail and (ii) rectangle 1011*f*, which has a unit of HA reserve that can be used to bring up any of units of compute 31, 32, 33, 34, 35, or 36 should one of nodes 1010*b-c* or 1010*e-g* fail.

Node 1010*b* includes rectangles 1012*a-h*, two of which represent HA reservations (i.e., (i) rectangle 1012*a*, which has a unit of HA reserve that can be used to bring up any of units of compute 1, 2, 3, 4, 5, or 6 should one of nodes 1010*a* or 1010*d-g* fail and (ii) rectangle 1012*e*, which has a unit of HA reserve that can be used to bring up any of units of compute 25, 26, 27, 28, 29, or 30 should one of nodes 1010*b-c* or 1010*e-g* fail.

Node 1010*c* includes rectangles 1013*a-h*, two of which represent HA reservations (i.e., (i) rectangle 1013*a*, which has a unit of HA reserve that can be used to bring up any of units of compute 1, 2, 3, 4, 5, or 6 should one of nodes 1010*a* or 1010*d-g* fail and (ii) rectangle 1013*e*, which has a unit of HA reserve that can be used to bring up any of units of compute 25, 26, 27, 28, 29, or 30 should one of nodes 1010*b-c* or 1010*e-g* fail.

Node 1010*d* includes rectangles 1014*a-h*, two of which represent HA reservations (i.e., (i) rectangle 1014*b*, which has a unit of HA reserve that can be used to bring up any of units of compute 7, 8, 9, 10, 11, or 12 should one of nodes 1010*b-c* or 1010*e-g* fail and (ii) rectangle 1014*f*, which has a unit of HA reserve that can be used to bring up any of units of compute 31, 32, 33, 34, 35, or 36 should one of nodes 1010*b-c* or 1010*e-g* fail.

Node 1010*e* includes rectangles 1015*a-h*, two of which represent HA reservations (i.e., (i) rectangle 1015*c*, which has a unit of HA reserve that can be used to bring up any of units of compute 13, 14, 15, 16, 17, or 18 should one of nodes 1010*a-d* or 1010*g-h* fail and (ii) rectangle 1015*g*, which a unit of HA reserve that can be used to bring up any of units of compute 37, 38, 39, 40, 41, or 42 should one of nodes 1010*a-d* or 1010*g-h* fail.

Node 1010*f* includes rectangles 1016*a-h*, two of which represent HA reservations (i.e., (i) rectangle 1016*c*, which has a unit of HA reserve that can be used to bring up any of units of compute 13, 14, 15, 16, 17, or 18 should one of nodes 1010*a-d* or 1010*g-h* fail and (ii) rectangle 1016*g*, which has a unit of HA reserve that can be used to bring up any of units of compute 37, 38, 39, 40, 41, or 42 should one of nodes 1010*a-d* or 1010*g-h* fail.

Node 1010*g* includes rectangles 1017*a-h*, two of which represent HA reservations (i.e., (i) rectangle 1017*d*, which has a unit of HA reserve that can be used to bring up any of units of compute 19, 20, 21, 22, 23, or 24 should one of nodes 1010*a-f* fail and (ii) rectangle 1017*h*, which has a unit of HA reserve that can be used to bring up any of units of compute 43, 44, 45, 46, 47, or 48 should one of nodes 1010*a-f* fail.

Node 1010*h* includes rectangles 1018*a-h*, two of which represent HA reservations (i.e., (i) rectangle 1018*d*, which has a unit of HA reserve that can be used to bring up any of units of compute 19, 20, 21, 22, 23, or 24 should one of nodes 1010*a-f* fail and (ii) rectangle 1018*h*, which has a unit of HA reserve that can be used to bring up any of units of compute 43, 44, 45, 46, 47, or 48 should one of nodes 1010*a-f* fail.

As illustrated by this example, the proposed scheduling algorithm is optimal and can schedule 48 pods on 8 nodes, whereas the naive tightly coupled HA reservation implementation would require (48×3)/8=18 nodes. This means the proposed scheduling algorithm results in 55.56% savings in compute costs. The proposed algorithm is also more efficient than the naive tightly coupled HA reservation implementation as in the absence of failures, only 25% of the total capacity is reserved for HA failures as opposed to 33%. The savings is even higher with larger clusters.

Compared to the naive loosely coupled HA reservation implementation, which would require two nodes to be set aside for HA, the proposed algorithm has the same efficiency (i.e., 75%), but the proposed approach can burst up to the capacity of 16 units of compute (2 nodes) when no failure happens or up to the capacity of 8 units of compute (1 node) when a single failure happens. This results in faster compute given the same resources and cost. For example, if it takes 1 hour to get a computation done with the naïve loosely coupled HA reservation implementation, it would take 45 minutes with the HA model illustrated by FIG. 10 when no failure happens (i.e., computing with 8 nodes instead of 6) or at most 51 minutes when a single failure happens (computing with 7 nodes if the failure happens at the very beginning of a run).

Referring back to EQ #1-3, the HA model for tolerating two node failures in cluster 1000 results in u, h, and e values as follows:

$$u = 8 \times (8-2) = 48$$

$$h = (48 \times 2)/(8-2) = 16$$

$$e = 48/64 = 0.75$$

Figure 11:
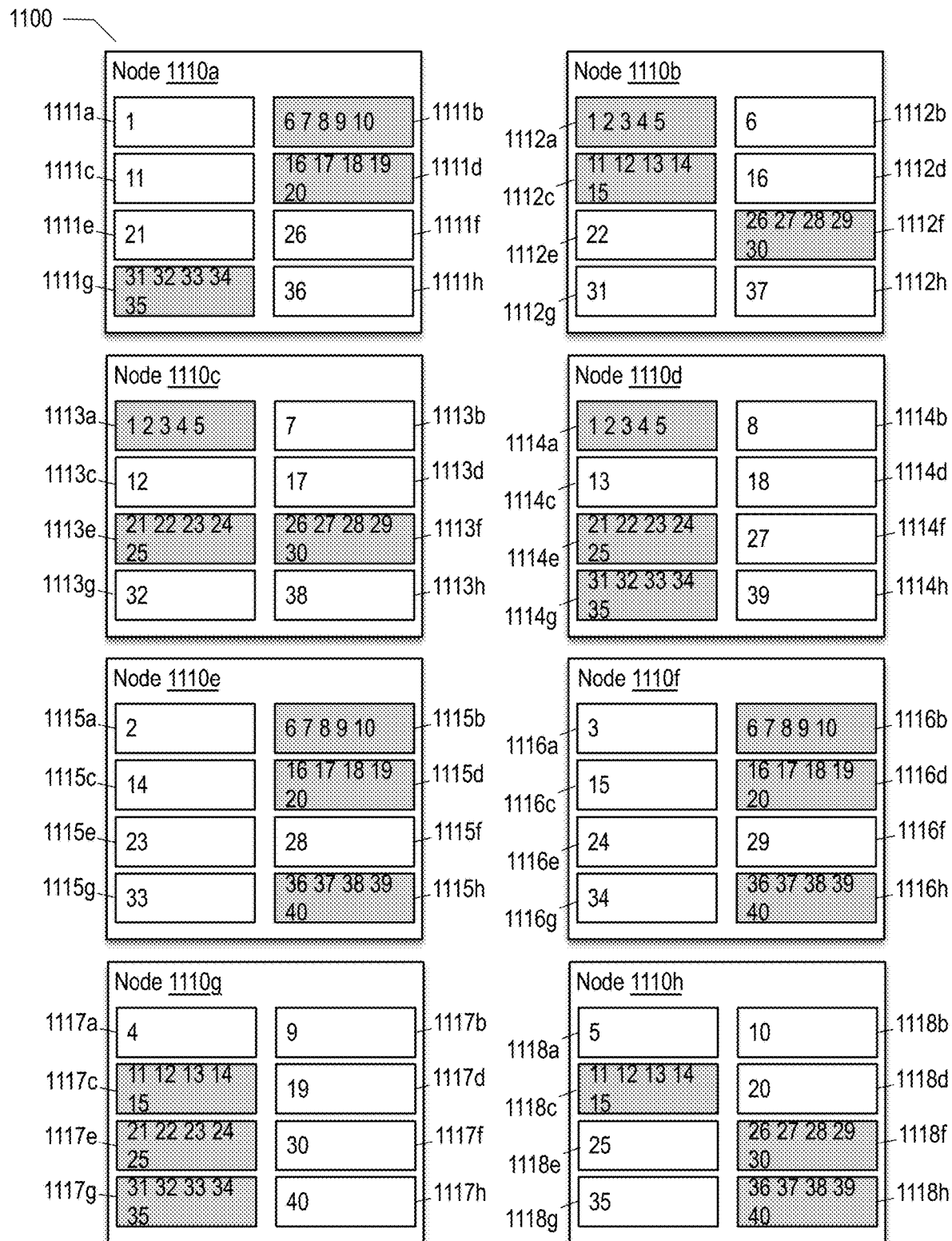
FIG. 11 is a block diagram illustrating an HA model for tolerating failure of any three nodes in an eight-node cluster in accordance with an embodiment of the present disclosure.

FIG. 11 is a block diagram illustrating an HA model for tolerating failure of any three nodes in an eight-node cluster 1100 in accordance with an embodiment of the present disclosure. As in the prior examples, the rectangles having a white background within nodes 1110*a-h* represent resource capacity that is scheduled for utilization by units of compute, whereas the rectangles having a gray background each represent a unit of HA reserve for supporting failover of a unit of compute from an unhealthy node.

In the context of the present example, node 1110*a* includes rectangles 1111*a-h*, three of which represent HA reservations (i.e., (i) rectangle 1111*b*, which has a unit of HA reserve that can be used to bring up any of units of compute 6, 7, 8, 9, or 10 should one of nodes 1110*b-d* or 1110*g-h* fail, (ii) rectangle 1111*d*, which has a unit of HA reserve that can be used to bring up any of units of compute 16, 17, 18, 19, or 20 should one of nodes 1110*b-d* or 1110*g-h* fail, and (iii) rectangle 1111*g*, which has a unit of HA reserve that can be used to bring up any of units of compute 31, 32, 33, 34, or 35 should one of nodes 1110*b-c*, 1110*e-f* or 1110*h* fail.

Node 1110*b* includes rectangles 1112*a-h*, three of which represent HA reservations (i.e., (i) rectangle 1112*a*, which has a unit of HA reserve that can be used to bring up any of units of compute 1, 2, 3, 4, or 5 should one of nodes 1110*a* or 1110*e-h* fail, (ii) rectangle 1112*c*, which has a unit of HA reserve that can be used to bring up any of units of compute 11, 12, 13, 14, or 15 should one of nodes 1110*a*, 1110*c-f* fail, and (iii) rectangle 1112*f*, which has a unit of HA reserve that can be used to bring up any of units of compute 26, 27, 28, 29, or 30 should one of nodes 1110*a* or 1110*d-g* fail.

Node 1110*c* includes rectangles 1113*a-h*, three of which represent HA reservations (i.e., (i) rectangle 1113*a*, which has a unit of HA reserve that can be used to bring up any of units of compute 1, 2, 3, 4, or 5 should one of nodes 1110*a* or 1110*e-h* fail, (ii) rectangle 1113*e*, which has a unit of HA reserve that can be used to bring up any of units of compute 21, 22, 23, 24, or 25 should one of nodes 1110*a-b*, 1110*e-f*, or 1110*h* fail, and (iii) rectangle 1113*f*, which has a unit of HA reserve that can be used to bring up any of units of compute 26, 27, 28, 29, or 30 should one of nodes 1110*a* or 1110*d-g* fail.

Node 1110*d* includes rectangles 1114*a-h*, three of which represent HA reservations (i.e., (i) rectangle 1114*a*, which has a unit of HA reserve that can be used to bring up any of units of compute 1, 2, 3, 4, or 5 should one of nodes 1110*a* or 1110*e-h* fail, (ii) rectangle 1114*e*, which has a unit of HA reserve that can be used to bring up any of units of compute 21, 22, 23, 24, or 25 should one of nodes 1110*a-b*, 1110*e-f*, or 1110*h* fail, and (iii) rectangle 1113*f*, which has a unit of HA reserve that can be used to bring up any of units of compute 31, 32, 33, 34, or 35 should one of nodes 1110*b-c*, 1110*e-f*, or 1110*h* fail.

Node 1110*e* includes rectangles 1115*a-h*, three of which represent HA reservations (i.e., (i) rectangle 1115*b*, which has a unit of HA reserve that can be used to bring up any of units of compute 6, 7, 8, 9, or 10 should one of nodes 1110*b-d* or 1110*g-h* fail, (ii) rectangle 1115*d*, which has a unit of HA reserve that can be used to bring up any of units of compute 16, 17, 18, 19, or 20 should one of nodes 1110*b-d* or 1110*g-h* fail, and (iii) rectangle 1115*h*, which has a unit of HA reserve that can be used to bring up any of units of compute 36, 37, 38, 39, or 40 should one of nodes 1110*a-d* or 1110*g* fail.

Node 1110*f* includes rectangles 1116*a-h*, three of which represent HA reservations (i.e., (i) rectangle 1116*b*, which has a unit of HA reserve that can be used to bring up any of units of compute 6, 7, 8, 9, or 10 should one of nodes 1110*b-d* or 1110*g-h* fail, (ii) rectangle 1116*d*, which has a unit of HA reserve that can be used to bring up any of units of compute 16, 17, 18, 19, or 20 should one of nodes 1110*b-d* or 1110*g-h* fail, and (iii) rectangle 1116*h*, which a unit of HA reserve that can be used to bring up any of units of compute 36, 37, 38, 39, or 40 should one of nodes 1110*a-d* or 1110*g* fail.

Node 1110*g* includes rectangles 1117*a-h*, three of which represent HA reservations (i.e., (i) rectangle 1117*c*, which has a unit of HA reserve that can be used to bring up any of units of compute 11, 12, 13, 14, or 15 should one of nodes 1110*a*, 1110*c-f* fail, (ii) rectangle 1117*e*, which has a unit of HA reserve that can be used to bring up any of units of compute 21, 22, 23, 24, or 25 should one of nodes 1110*a-b*,

1110*e-f*, or 1110*h* fail, and (iii) rectangle 1117*g*, which has a unit of HA reserve that can be used to bring up any of units of compute 31, 32, 33, 34, or 35 should one of nodes 1110*b-c*, 1110*e-f* or 1110*h* fail.

Node 1110*h* includes rectangles 1118*a-h*, three of which represent HA reservations (i.e., (i) rectangle 1118*c*, which has a unit of HA reserve that can be used to bring up any of units of compute 11, 12, 13, 14, or 15 should one of nodes 1110*a*, 1110*c-f* fail, (ii) rectangle 1118*f*, which has a unit of HA reserve that can be used to bring up any of units of compute 26, 27, 28, 29, or 30 should one of nodes 1110*a* or 1110*d-g* fail, and (iii) rectangle 1118*h*, which has a unit of HA reserve that can be used to bring up any of units of compute 36, 37, 38, 39, or 40 should one of nodes 1110*a-d* or 1110*g* fail.

The naïve tightly coupled HA reservation implementation would have required 40/8×4=20 nodes to schedule 40 pods and tolerate 3 node failures (a 60% cost savings for the proposed algorithm that uses only 8 nodes) if nodes are tightly coupled in groups of 4 nodes. Compared to the naïve loosely coupled HA reservation implementation, the proposed approach can burst the compute capacity by the capacity of 3 nodes. Using 8 nodes, instead of 5 nodes per the naïve loosely coupled HA reservation implementation, can potentially lead to a 60% speedup in compute when there are no node failures.

Referring back to EQ #1-3, the HA model for tolerating three node failures in cluster 1000 results in u, h, and e values as follows:

$$u = 8 \times (8-3) = 40$$

$$h = (40 \times 3)/(8-3) = 824$$

$$e = 40/64 = 0.625$$

Figure 12:
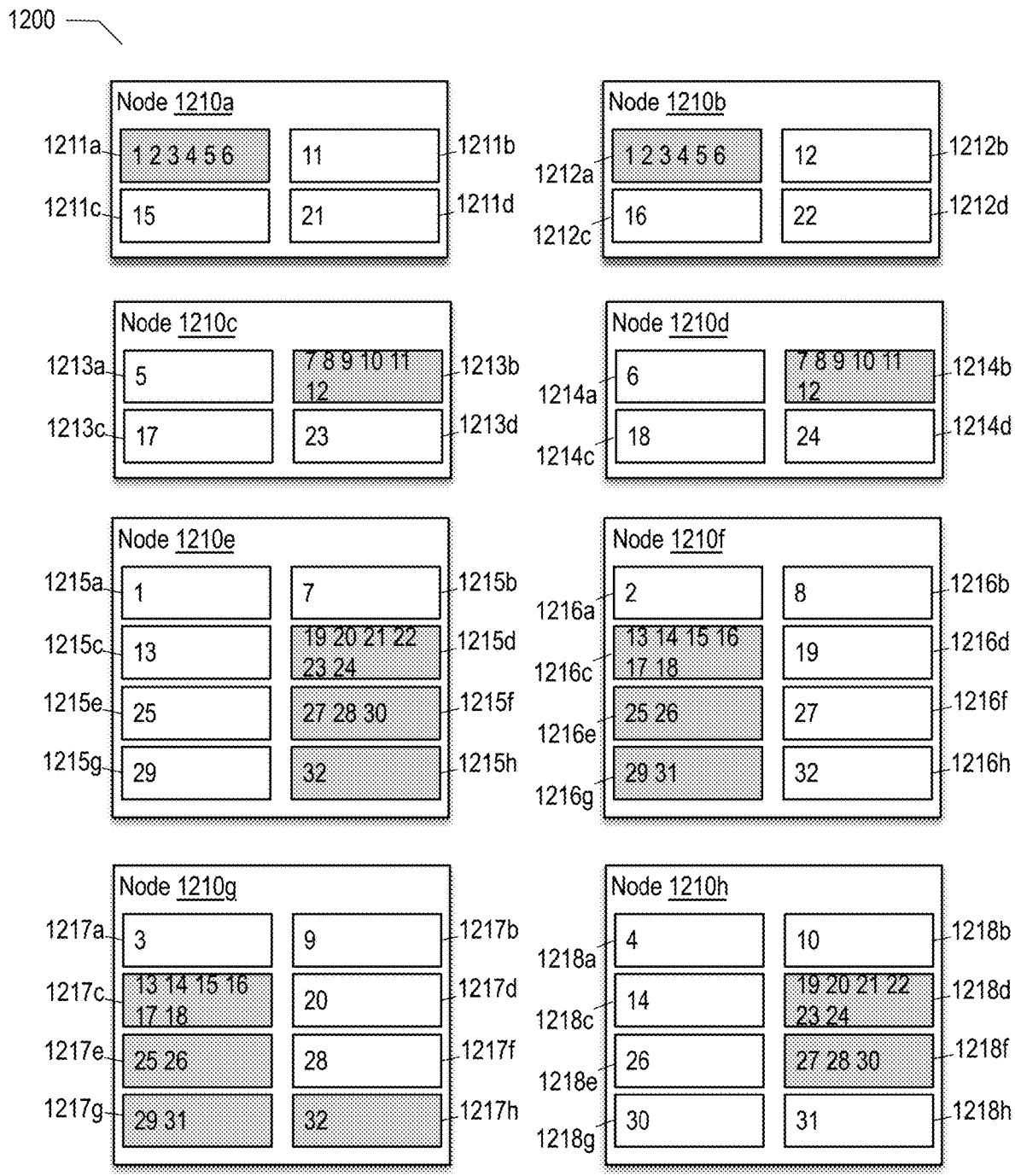
FIG. 12 is a block diagram illustrating an HA model for tolerating a two-node failure in an eight-node cluster having heterogeneous nodes in accordance with an embodiment of the present disclosure.

FIG. 12 is a block diagram illustrating an HA model for tolerating a two-node failure in an eight-node cluster 1200 having heterogeneous nodes in accordance with an embodiment of the present disclosure. As in the prior examples, the rectangles having a white background within nodes 1210*a-h* represent resource capacity that is scheduled for utilization by a specified unit of compute, whereas the rectangles having a gray background each represent a unit of HA reserve for supporting failover of a unit of compute from an unhealthy node.

In the context of the present example, nodes 1210*a-d* can each accommodate 3 units of compute, nodes 1210*e-f* can each accommodate 5 units of compute, node 1210*g* can accommodate 4 units of compute, and node 1210*h* can accommodate 6 units of compute for a total of 32 units of compute cluster wide. Node 1210*a* includes rectangles 1211*a-d*, one of which represent an HA reservation (i.e., rectangle 1211*a*, which has a unit of HA reserve that can be used to bring up any of units of compute 1, 2, 3, 4, 5, or 6 should one of nodes 1210*c-h* fail).

Node 1210*b* includes rectangles 1212*a-d*, one of which represent an HA reservation (i.e., rectangle 1212*a*, which a unit of HA reserve that can be used to bring up any of units of compute 1, 2, 3, 4, 5, or 6 should one of nodes 1210*c-h* fail).

Node 1210*c* includes rectangles 1213*a-d*, one of which represent an HA reservation (i.e., rectangle 1213*b*, which has a unit of HA reserve that can be used to bring up any of units of compute 7, 8, 9, 10, 11, or 12 should one of nodes 1210*a-b* or 1210*e-h* fail).

Node 1210*d* includes rectangles 1214*a-d*, one of which represent an HA reservation (i.e., rectangle 1214*b*, which has a unit of HA reserve that can be used to bring up any of units of compute 7, 8, 9, 10, 11, or 12 should one of nodes 1210*a-b* or 1210*e-h* fail).

Node 1210*e* includes rectangles 1215*a-h*, three of which represent an HA reservation (i.e., (i) rectangle 1215*d*, which has a unit of HA reserve that can be used to bring up any of units of compute 19, 20, 21, 22, 23, or 24 should one of nodes 1210*a-d* or 1210*f-g* fail, (ii) rectangle 1215*f*, which has a unit of HA reserve that can be used to bring up any of units of compute 27, 28, or 30 should one of nodes 1210*f-h* fail, and (iii) rectangle 1215*h*, which has a unit of HA reserve that can be used to bring up unit of compute 32 should node 1210*f* fail).

Node 1210*f* includes rectangles 1216*a-h*, three of which represent an HA reservation (i.e., (i) rectangle 1216*c*, which has a unit of HA reserve that can be used to bring up any of units of compute 13, 14, 15, 16, 17, or 18 should one of nodes 1210*a-e* or 1210*h* fail, (ii) rectangle 1216*e*, which has a unit of HA reserve that can be used to bring up either of units of compute 25 or 26 should one of nodes 1210*e* or 1210*h* fail, and (iii) rectangle 1216*g*, which has a unit of HA reserve that can be used to bring up either of units of compute 29 or 31 should node 1210*e* or 1210*h* fail).

Node 1210*g* includes rectangles 1217*a-h*, four of which represent an HA reservation (i.e., (i) rectangle 1217*c*, which has a unit of HA reserve that can be used to bring up any of units of compute 13, 14, 15, 16, 17, or 18 should one of nodes 1210*a-e* or 1210*h* fail, (ii) rectangle 1217*e*, which has a unit of HA reserve that can be used to bring up either of units of compute 25 or 26 should one of nodes 1210*e* or 1210*h* fail, (iii) rectangle 1217*g*, which has a unit of HA reserve that can be used to bring up either of units of compute 29 or 31 should node 1210*e* or 1210*h* fail, and (iv) rectangle 1217*h*, which has a unit of HA reserve that can be used to bring up unit of compute 32 should node 1210*f* fail).

Node 1210*h* includes rectangles 1218*a-h*, two of which represent an HA reservation (i.e., (i) rectangle 1218*d*, which has a unit of HA reserve that can be used to bring up any of units of compute 19, 20, 21, 22, 23, or 24 should one of nodes 1210*a-d* or 1210*f-g* fail and (ii) rectangle 1218*f*, which has a unit of HA reserve that can be used to bring up any of units of compute 27, 28, or 30 should one of nodes 1210*f-h* fail).

Assuming the naïve tightly coupled HA reservation implementation first populates the smaller nodes, then this implementation would have required twelve 4-unit of compute nodes and six 8-unit of compute nodes to schedule 32 units of compute, representing a 50% cost savings with the proposed algorithm. Again, the total HA reserves also match setting aside two 8-unit of compute nodes for the naive loosely coupled HA reservation implementation, but compared to the naïve loosely coupled HA reservation implementation, as a result of the distribution of the HA reservations, the proposed approach provides for burst capacity of 2 8-unit of compute nodes.

In the context of the present example, the heterogeneous node setup may be converted into the following two homogeneous node setups:

Group 1: 8 nodes of size 4 (this includes nodes 1210*a-d* plus half the capacity of nodes 1210*e*-1210*h*, which maps to the capacity associated with units of compute or HA reserve 1215*a-d*, 1216*a-d*, 1217*a-d*, and 1218*a-d*) tolerating 2 node failures. Referring back to EQ #1-2, values of u and h are as follows for group 1:

$$u_1 = 4 \times (8-2) = 24$$

$$h_1 = (24 \times 2)/(8-2) = 8$$

Group 2: 4 nodes of size 4 (the other half of the capacity of nodes 1210e-1210h, which maps to the capacity associated with units of compute or HA reserve 1215e-h, 1216e-h, 1217e-h, and 1218e-h) tolerating 2 node failures. Referring back to EQ #1-2, values of u and h are as follows for group 2:

$$u_2=4\times(4-2)=8$$

$$h_2=(8\times2)/(4-2)=8$$

Combining the values of $u_1$ and $u_2$ and $h_1$ and $h_2$ and using EQ #3 to calculate e results in the following:

$$u=u_1+u_2=32$$

$$h=h_1+h_2=16$$

$$e=32/48=0.66$$

Figure 13:
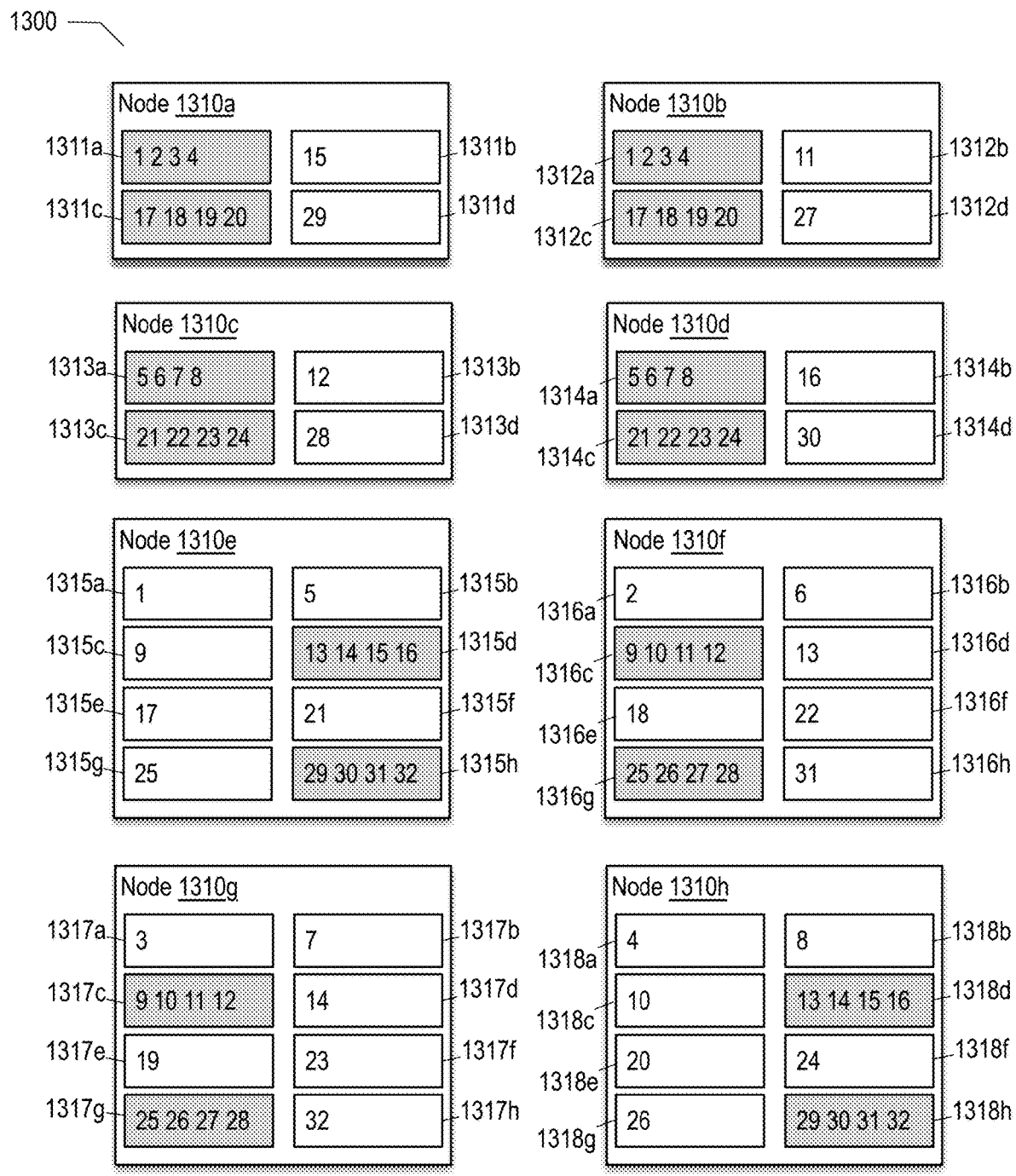
FIG. 13 is a block diagram illustrating an HA model for tolerating a two-node failure in an eight-node cluster having heterogeneous nodes in accordance with another embodiment of the present disclosure.

FIG. 13 is a block diagram illustrating an HA model for tolerating a two-node failure in an eight-node cluster 1300 having heterogeneous nodes in accordance with another embodiment of the present disclosure. In this example, rather than using the greedy algorithm, which tries to maximize the use of existing HA reserves as described above with reference to FIG. 6, an alternative algorithm is used that spreads the 16 units of HA reserve and the 32 units of compute more evenly across nodes.

As in the prior examples, the rectangles having a white background within nodes 1310a-h represent resource capacity that is scheduled for utilization by units of compute, whereas the rectangles having a gray background represent HA reserves each corresponding to a unit of HA reserve for supporting failover of a unit of compute from an unhealthy node.

In the context of the present example, nodes 1310a-d can each accommodate 2 units of compute and nodes 1310e-h can each accommodate 6 units of compute. Node 1310a includes rectangles 1311a-d, two of which represent HA reservations (i.e., (i) rectangle 1311a, which has a unit of HA reserve that can be used to bring up any of units of compute 1, 2, 3, or 4 should one of nodes 1310e-h fail and (ii) rectangle 1311c, which has a unit of HA reserve that can be used to bring up any of units of compute 17, 18, 19, or 20 should one of nodes 1310e-h fail).

Node 1310b includes rectangles 1312a-d, two of which represent HA reservations (i.e., (i) rectangle 1312a, which has a unit of HA reserve that can be used to bring up any of units of compute 1, 2, 3, or 4 should one of nodes 1310e-h fail and (ii) rectangle 1312c, which has a unit of HA reserve that can be used to bring up any of units of compute 17, 18, 19, or 20 should one of nodes 1310e-h fail).

Node 1310c includes rectangles 1313a-d, two of which represent HA reservations (i.e., (i) rectangle 1313a, which has a unit of HA reserve that can be used to bring up any of units of compute 5, 6, 7, or 8 should one of nodes 1310e-h fail and (ii) rectangle 1313c, which has a unit of HA reserve that can be used to bring up any of units of compute 21, 22, 23, or 24 should one of nodes 1310e-h fail).

Node 1310d includes rectangles 1314a-d, two of which represent HA reservations (i.e., (i) rectangle 1314a, which has a unit of HA reserve that can be used to bring up any of units of compute 5, 6, 7, or 8 should one of nodes 1310e-h fail and (ii) rectangle 1314c, which has a unit of HA reserve that can be used to bring up any of units of compute 21, 22, 23, or 24 should one of nodes 1310e-h fail).

Node 1310e includes rectangles 1315a-h, two of which represent HA reservations (i.e., (i) rectangle 1315d, which a unit of HA reserve that can be used to bring up any of units of compute 13, 14, 15, or 16 should one of nodes 1310a, 1310d, or 1310f-g fail and (ii) rectangle 1315h, which has a unit of HA reserve that can be used to bring up any of units of compute 29, 30, 31, or 32 should one of nodes 1310a, 1310d, or 1310f-g fail).

Node 1310f includes rectangles 1316a-h, two of which represent HA reservations (i.e., (i) rectangle 1316c, which has a unit of HA reserve that can be used to bring up any of units of compute 9, 10, 11, or 12 should one of nodes 1310b, 1310c, 1310e, or 1310h fail and (ii) rectangle 1316g, which has a unit of HA reserve that can be used to bring up any of units of compute 25, 26, 27, or 28 should one of nodes 1310b, 1310c, 1310e, or 1310h fail).

Node 1310g includes rectangles 1317a-h, two of which represent HA reservations (i.e., (i) rectangle 1317c, which has a unit of HA reserve that can be used to bring up any of units of compute 9, 10, 11, or 12 should one of nodes 1310b, 1310c, 1310e, or 1310h fail and (ii) rectangle 1317g, which has a unit of HA reserve that can be used to bring up any of units of compute 25, 26, 27, or 28 should one of nodes 1310b, 1310c, 1310e, or 1310h fail).

Node 1310h includes rectangles 1318a-h, two of which represent HA reservations (i.e., (i) rectangle 1318d, which has a unit of HA reserve that can be used to bring up any of units of compute 13, 14, 15, or 16 should one of nodes 1310a, 1310d, or 1310f-g fail and (ii) rectangle 1318h, which has a unit of HA reserve that can be used to bring up any of units of compute 29, 30, 31, or 32 should one of nodes 1310a, 1310d, or 1310f-g fail).

This example illustrates a slightly different schedule than the one shown in FIG. 12. Unlike the assignments of FIG. 12 in which the algorithm sought to maximize assignments to the existing HA reservations, this algorithm variation maximizes the spread of units of HA reserve across the nodes. Unlike the algorithm described in FIG. 6, this approach is not maximizing the association of the units of HA reserve to the existing units of compute (in this example, assignment of units of compute to units of HA reserve stop at 4, before reaching the maximum limit of n−f=6).

More specifically, in this example, there are 32 units of compute. Each unit of compute has 2 replicas in HA reserves to tolerate two failures. Therefore, a total of 64 units of compute are assigned across 8 nodes to 16 from FIG. 12, EQ #2 described above, or total capacity−u=48−32=16) units of HA reserve. This means each node has two units of HA reserve (16 /8 =2), where each unit is associated with 4 (64/16 32 4) units of compute to have a balanced distribution of units of HA reserve across all nodes. This is unlike FIG. 12 where Node 1210a-d had a single unit of HA reserve mapping to 6 units of compute, nodes 1210e-f have 3 units of HA reserve mapping to a different number of units of compute, node 1210g had 4 units of HA reserve mapping to a different number of units of compute, and node 1210h had 2 units of HA reserves mapping to a different number of units of compute.

Figure 14:
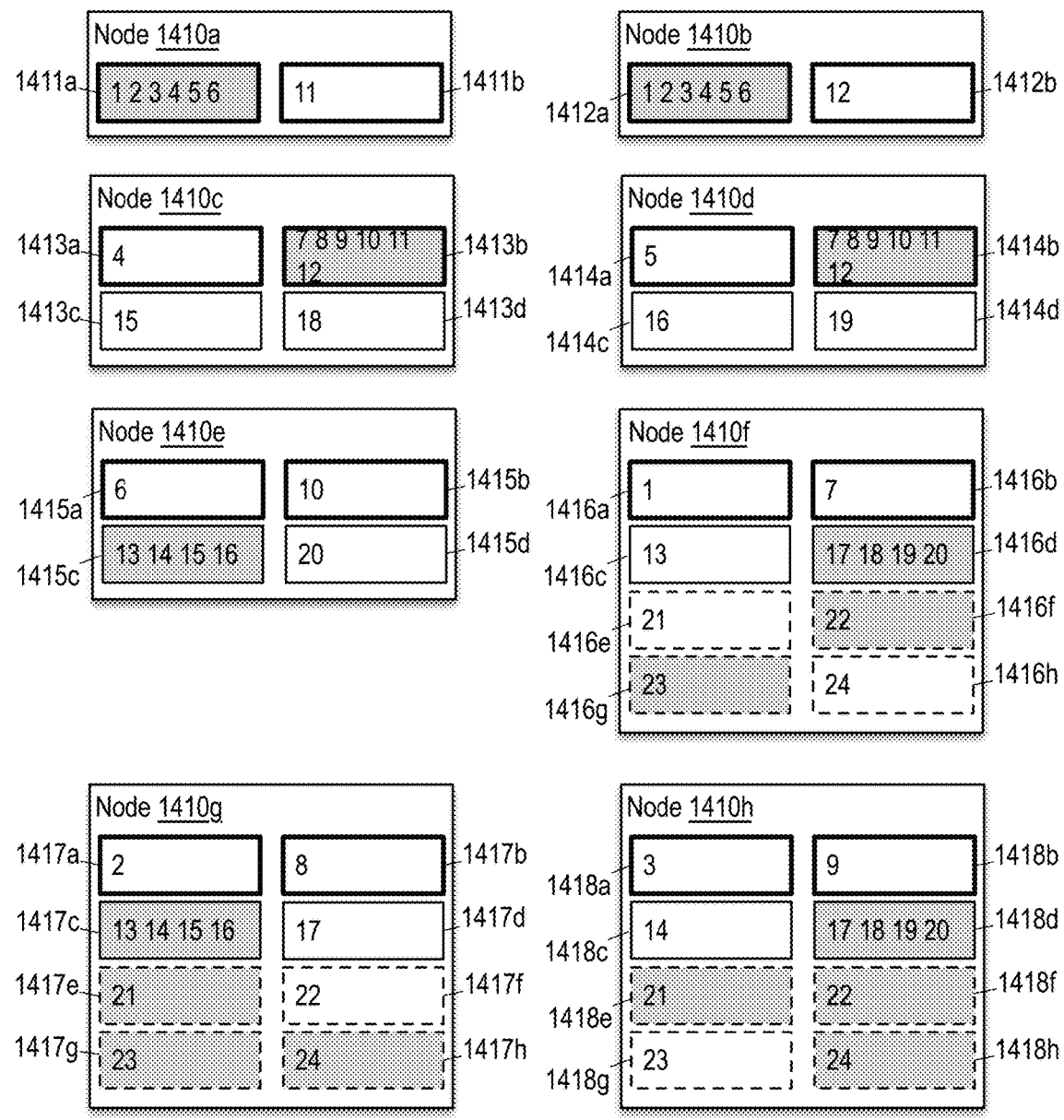
FIG. 14 is a block diagram illustrating an HA model for tolerating a two-node failure in an eight-node cluster having heterogeneous nodes in accordance with an embodiment of the present disclosure.

FIG. 14 is a block diagram illustrating an HA model for tolerating a two-node failure in an eight-node cluster having heterogeneous nodes in accordance with an embodiment of the present disclosure. As in the prior examples, the rectangles having a white background within nodes 1410a-h represent resource capacity that is scheduled for utilization by a specified unit of compute, whereas the rectangles having a gray background each represent a unit of HA reserve for supporting failover of a unit of compute from an unhealthy node.

In the context of the present example, nodes 1410a-b can each accommodate 2 units of compute or HA reserve, nodes 1410c-e can each accommodate 4 units of compute or HA reserve, and node 1410f-h can each accommodate 8 units of compute or HA reserve. Node 1410a includes rectangles 1411a-b, one of which represent an HA reservation (i.e., rectangle 1411a, which has a unit of HA reserve that can be used to bring up any of units of compute 1, 2, 3, 4, 5, or 6 should one of nodes 1410c-h fail).

Node 1410b includes rectangles 1412a-b, one of which represent an HA reservation (i.e., rectangle 1412a, which has a unit of HA reserve that can be used to bring up any of units of compute 1, 2, 3, 4, 5, or 6 should one of nodes 1410c-h fail).

Node 1410c includes rectangles 1413a-d, one of which represent an HA reservation (i.e., rectangle 1413b, which has a unit of HA reserve that can be used to bring up any of units of compute 7, 8, 9, 10, 11, or 12 should one of nodes 1410a-b or 1410e-h fail).

Node 1410d includes rectangles 1414a-d, one of which represent an HA reservation (i.e., rectangle 1414b, which has a unit of HA reserve that can be used to bring up any of units of compute 7, 8, 9, 10, 11, or 12 should one of nodes 1410a-b or 1410e-h fail).

Node 1410e includes rectangles 1415a-d, one of which represent an HA reservation (i.e., rectangle 1415c, which has a unit of HA reserve that can be used to bring up any of units of compute 13, 14, 15, or 16 should one of nodes 1410c-d, 1410f or 1410h fail).

Node 1410f includes rectangles 1416a-h, three of which represent HA reservations (i.e., (i) rectangle 1416d, which has a unit of HA reserve that can be used to bring up any of units of compute 17, 18, 19, or 20 should one of nodes 1410c-d, 1410e or 1410g fail, (ii) rectangle 1416f, which has a unit of HA reserve that can be used to bring up unit of compute 22 should node 1410g fail, and (iii) rectangle 1416g, which has a unit of HA reserve that can be used to bring up unit of compute 23 should node 1410h fail.).

Node 1410g includes rectangles 1417a-h, four of which represent HA reservations (i.e., (i) rectangle 1417c, which has a unit of HA reserve that can be used to bring up any of units of compute 13, 14, 15, or 16 should one of nodes 1410c-d, 1410f or 1410h fail, (ii) rectangle 1417e, which has a unit of HA reserve that can be used to bring up unit of compute 21 should node 1410f fail, (iii) rectangle 1417g, which has a unit of HA reserve that can be used to bring up unit of compute 23 should node 1410h fail, and (iv) rectangle 1417h, which has a unit of HA reserve that can be used to bring up unit of compute 24 should node 1410f fail.).

Node 1410h includes rectangles 1418a-h, four of which represent HA reservations (i.e., (i) rectangle 1418d, which has a unit of HA reserve that can be used to bring up any of units of compute 17, 18, 19, or 20 should one of nodes 1410c-d, 1410e or 1410g fail, (ii) rectangle 1418e, which has a unit of HA reserve that can be used to bring up unit of compute 21 should node 1410f fail, (iii) rectangle 1418f, which has a unit of HA reserve that can be used to bring up unit of compute 22 should node 1410g fail, and (iv) rectangle 1418h, which has a unit of HA reserve that can be used to bring up unit of compute 24 should node 1410f fail.).

In the context of the present example, the heterogeneous node setup may be converted into the following three homogeneous node setups:

Group 1 (the thick outlined rectangles): 8 nodes of size 2 tolerating 2 node failures. Referring back to EQ #1-2, values of u and h are as follows for group 1:

$$u_1=2\times(8-2)=12$$

$$h_1=(12\times2)/(8-2)=4$$

Group 2 (the regular outlined rectangles): 6 nodes of size 2 tolerating 2 node failures. Referring back to EQ #1-2, values of u and h are as follows for group 2:

$$u_2=2\times(6-2)=8$$

$$h_2=(8\times2)/(6-2)=4$$

Group 3 (the dashed outlined rectangles): 3 nodes of size 4 tolerating 2 node failures. Referring back to EQ #1-2, values of u and h are as follows for group 3:

$$u_3=4\times(3-2)=4$$

$$h_3=(4\times2)/(3-2)=8$$

Combining the values of $u_1$, $u_2$, and $u_3$ and $h_1$, $h_2$, and $h_3$ and using EQ #3 to calculate e results in the following:

$$u=u_1+u_2+u_3=24$$

$$h=h_1+h_2+h_3=16$$

$$e=24/40=0.6$$

Figure 15:
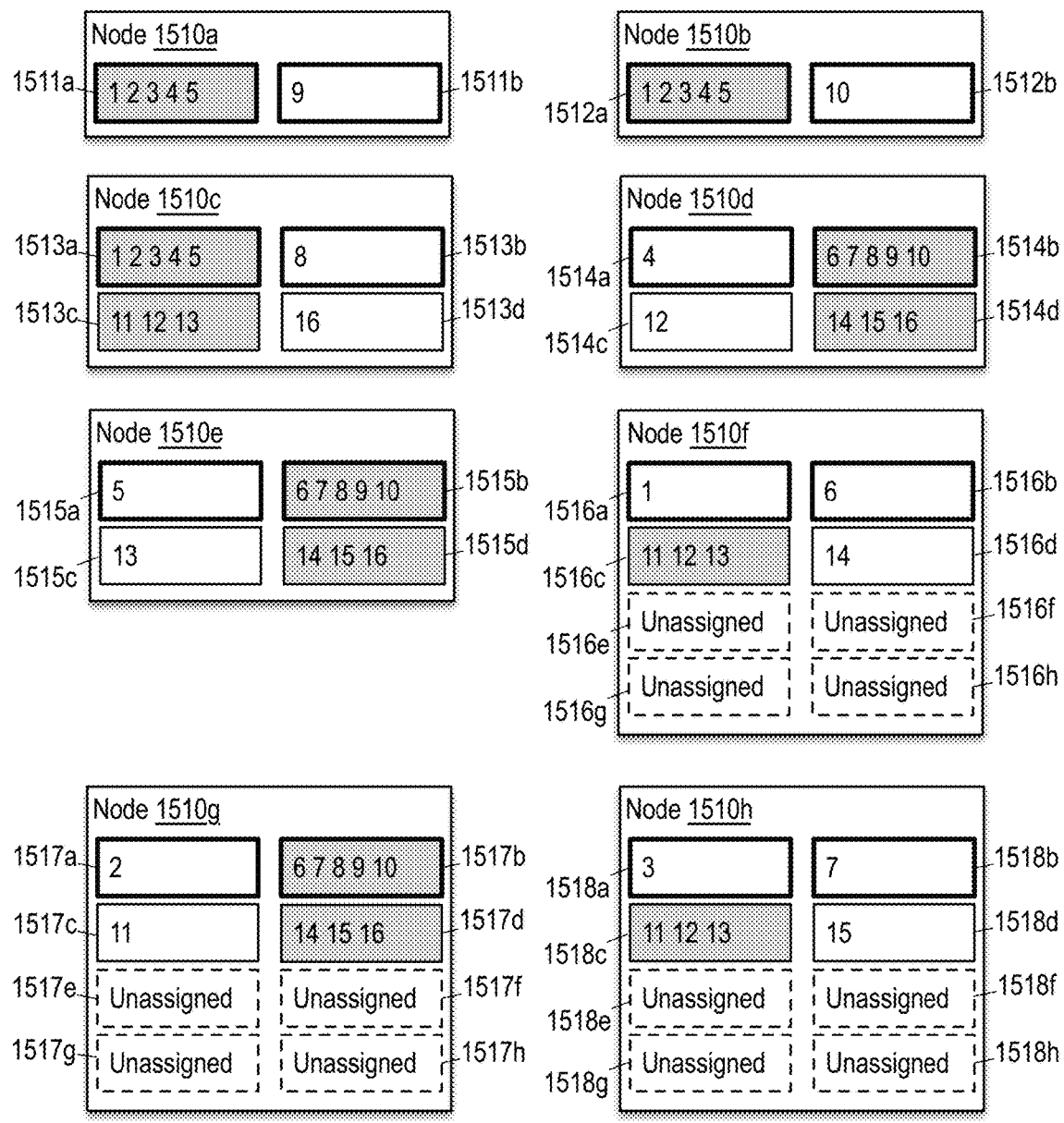
FIG. 15 is a block diagram illustrating an HA model for tolerating a three-node failure in an eight-node cluster having heterogeneous nodes in accordance with an embodiment of the present disclosure.

FIG. 15 is a block diagram illustrating an HA model for tolerating a three-node failure in an eight-node cluster having heterogeneous nodes in accordance with an embodiment of the present disclosure. As in the prior examples, the rectangles having a white background within nodes 1410a-h represent resource capacity that is scheduled for utilization by a specified unit of compute, whereas the rectangles having a gray background each represent a unit of HA reserve for supporting failover of a unit of compute from an unhealthy node.

In the context of the present example, nodes 1510a-b can each accommodate 2 units of compute or HA reserve, nodes 1510c-e can each accommodate 4 units of compute or HA reserve, and node 1510f-h can each accommodate 8 units of compute or HA reserve. Node 1510a includes rectangles 1511a-b, one of which represents an HA reservation (i.e., rectangle 1511a, which has a unit of HA reserve that can be used to bring up any of units of compute 1, 2, 3, 4, or 5 should one of nodes 1510d-h fail).

Node 1510b includes rectangles 1512a-b, one of which represent an HA reservation (i.e., rectangle 1512a, which has a unit of HA reserve that can be used to bring up any of units of compute 1, 2, 3, 4, or 5 should one of nodes 1510d-h fail).

Node 1510c includes rectangles 1513 a-d, two of which represent HA reservations (i.e., (i) rectangle 1513a, which has a unit of HA reserve that can be used to bring up any of units of compute 1, 2, 3, 4, or 5 should one of nodes 1510d-h fail and (ii) rectangle 1513c, which has a unit of HA reserve that can be used to bring up any of units of compute 11, 12, or 13 should one of nodes 1510d-e or 1510g fail).

Node 1510d includes rectangles 1514a-d, two of which represent HA reservations (i.e., (i) rectangle 1514b, which has a unit of HA reserve that can be used to bring up any of units of compute 6, 7, 8, 9, or 10 should one of nodes 1510a-c, 1510f, or 1510h fail and (ii) rectangle 1514d, which has a unit of HA reserve that can be used to bring up any of units of compute 14, 15, or 16 should one of nodes 1510c, 1510f, or 1510h fail).

Node 1510e includes rectangles 1515a-d, two of which represent HA reservations (i.e., (i) rectangle 1515b, which has a unit of HA reserve that can be used to bring up any of units of compute 6, 7, 8, 9, or 10 should one of nodes 1510a-c, 1510f, or 1510h fail and (ii) rectangle 1515d, which has a unit of HA reserve that can be used to bring up any of units of compute 14, 15, or 16 should one of nodes 1510*c*, 1510*f*, or 1510*h* fail).

Node 1510*f* includes rectangles 1516*a-h*, one of which represent an HA reservation (i.e., rectangle 1516*c*, which has a unit of HA reserve that can be used to bring up any of units of compute 11, 12, or 13 should one of nodes 1510*d-e* or 1510*g* fail).

Node 1510*g* includes rectangles 1517*a-h*, two of which represent HA reservations (i.e., (i) rectangle 1517*b*, which has a unit of HA reserve that can be used to bring up any of units of compute 6, 7, 8, 9, or 10 should one of nodes 1510*a-c*, 1510*f*, or 1510*h* fail and (ii) rectangle 1517*d*, which has a unit of HA reserve that can be used to bring up any of units of compute 14, 15, or 16 should one of nodes 1510*c*, 1510*f*, or 1510*h* fail).

Node 1510*h* includes rectangles 1518*a-h*, one of which represent an HA reservation (i.e., rectangle 1518*c*, which has a unit of HA reserve that can be used to bring up any of units of compute 11, 12, or 13 should one of nodes 1510*d-e* or 1510*g* fail).

In the context of the present example, the heterogeneous node set up may be converted into the following three homogeneous node setups:

Group 1 (the thick outlined rectangles): 8 nodes of size 2 tolerating 3 node failures. Referring back to EQ #1-2, values of u and h are as follows for group 1:

$$u_1=2\times(8-3)=10$$

$$h_1=(10\times3)/(8-3)=6$$

Group 2 (the regular outlined rectangles): 6 nodes of size 2 tolerating 3 node failures. Referring back to EQ #1-2, values of u and h are as follows for group 2:

$$u_2=2\times(6-3)=6$$

$$h_2=(6\times3)/(6-3)=6$$

Group 3 (the dashed outlined rectangles): 3 nodes of size 4 tolerating 3 node failures. Referring back to EQ #1-2, values of u and h are as follows for group 3:

$$u_3=4\times(3-3)=0$$

$$h_3=(4\times2)/(3-3)=\text{undefined}$$

Combining the values of $u_1$, $u_2$, and $u_3$ and $h_1$, $h_2$, and $h_3$ and using EQ #3 to calculate e results in the following:

$$u=u_1+u_2+u_3=16$$

$$h=h_1+h_2+h_3=12$$

$$e=16/40=0.4$$

Figure 16:
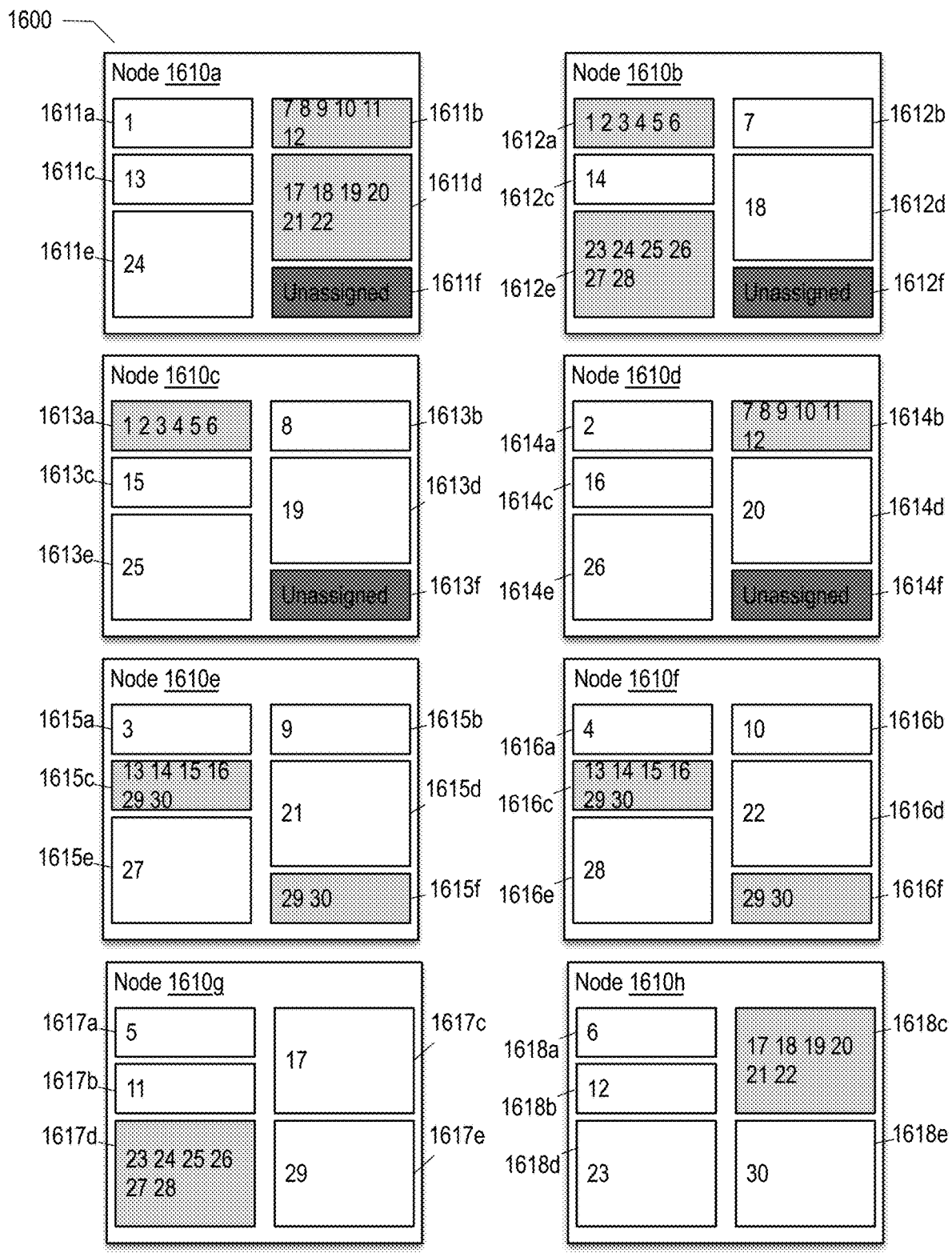
FIG. 16 is a block diagram illustrating an HA model for tolerating a two-node failure in an eight-node cluster in which the units of compute are heterogeneous in nature in accordance with another embodiment of the present disclosure.

FIG. 16 is a block diagram illustrating an HA model for tolerating two node failures in an eight-node cluster 1600 in which the units of compute are heterogeneous in nature in accordance with another embodiment of the present disclosure. As in the prior examples, the rectangles having a white background within nodes 1610*a-h* represent resource capacity that is scheduled for utilization by units of compute, whereas the rectangles having a gray background each represent a unit of HA reserve for supporting failover of a unit of compute from an unhealthy node.

FIG. 16 demonstrates the generality of the proposed algorithm to a scenario in which the units of compute have different sizes and the goal is to tolerate two node failures. In this example, there are 8 nodes that have the capacity to host 8 p-size units of compute. The first 16 units of compute that are scheduled have size p. Once the first 16 units of compute are scheduled, the algorithm starts scheduling units of compute that are of size 2p. The algorithm continues to add size 2p units of compute until it can no longer schedule a given unit of compute and its corresponding HA reserves.

In the context of the present example, node 1610*a* includes rectangles 1611*a-f*, one of which remains unassigned (i.e., rectangle 1611*f*) and two of which represent HA reservations (i.e., (i) rectangle 1611*b*, which has a unit of HA reserve that can be used to bring up any of units of compute 7, 8, 9, 10, 11, or 12 should one of nodes 1610*b-c* or 1610*e-h* fail and (ii) rectangle 1611*d*, which has a unit of HA reserve that can be used to bring up any of units of compute 17, 18, 19, 20, 21, or 22 should one of nodes 1610*b-g* fail).

Node 1610*b* includes rectangles 1612*a-f*, one of which remains unassigned (i.e., rectangle 1612*f*) and two of which represent HA reservations (i.e., (i) rectangle 1612*a*, which has a unit of HA reserve that can be used to bring up any of units of compute 1, 2, 3, 4, 5, or 6 should one of nodes 1610*a* or 1610*d-h* fail and (ii) rectangle 1612*e*, which has a unit of HA reserve that can be used to bring up any of units of compute 23, 24, 25, 26, 27, or 28 should one of nodes 1610*a*, 1610*c-f* or 1610*h* fail).

Node 1610*c* includes rectangles 1613*a-f*, one of which remains unassigned (i.e., rectangle 1613*f*) and one of which represents an HA reservation (i.e., rectangle 1613*a*, which has a unit of HA reserve that can be used to bring up any of units of compute 1, 2, 3, 4, 5, or 6 should one of nodes 1610*a* or 1010*d-h* fail).

Node 1610*d* includes rectangles 1614*a-f*, one of which remains unassigned (i.e., rectangle 1614*f*) and one of which represents an HA reservation (i.e., rectangle 1614*b*, which has a unit of HA reserve that can be used to bring up any of units of compute 7, 8, 9, 10, 11, or 12 should one of nodes 1610*b-c* or 1010*e-h* fail).

Node 1610*e* includes rectangles 1615*a-f*, two of which represent HA reservations (i.e., (i) rectangle 1615*c*, which has a unit of HA reserve that can be used to bring up any of units of compute 13, 14, 15, 16, 29, or 30 should one of nodes 1610*a-d* or 1610*g-h* fail and (ii) rectangle 1615*f*, which has a unit of HA reserve that can be used to bring up any of either of units of compute 29 or 30 should one of nodes 1610*g-h* fail).

Node 1610*f* includes rectangles 1616*a-f*, two of which represent HA reservations (i.e., (i) rectangle 1616*c*, which has a unit of HA reserve that can be used to bring up any of units of compute 13, 14, 15, 16, 29, or 30 should one of nodes 1610*a-d* or 1610*g-h* fail and (ii) rectangle 1616*f*, which has a unit of HA reserve that can be used to bring up any of either of units of compute 29 or 30 should one of nodes 1610*g-h* fail).

Node 1610*g* includes rectangles 1617*a-e*, one of which represents an HA reservation (i.e., rectangle 1617*d*, which has a unit of HA reserve that can be used to bring up any of units of compute 23, 24, 25, 26, 27, or 28 should one of nodes 1610*a*, 1610*c-f* or 1610*h* fail).

Node 1610*h* includes rectangles 1618*a-e*, one of which represents an HA reservation (i.e., rectangle 1618*c*, which has a unit of HA reserve that can be used to bring up any of units of compute 17, 18, 19, 20, 21, or 22 should one of nodes 1610*b-g* fail).

The assignments to nodes 1610*e-f* are particularly interesting because the same HA reserves are used to accommodate the failover of both size p and size 2p units of compute.

With the naïve tightly coupled HA reservation implementation, the first 16 units of compute can be scheduled using 2 nodes. Tolerating two failures for these nodes would have required 6 (2×3=6) nodes. The remaining 14 size 2p pods require 4 nodes. Tolerating two failures for these nodes would require 12 (4×3=12) nodes. Therefore, to tolerate 2 node failures, a total of 20 nodes would be required for the naïve tightly coupled HA reservation implementation instead of 8 nodes for the proposed algorithm as shown by FIG. 16.

With the naïve loosely coupled HA reservation implementation, 2 nodes would need to be set aside for HA failovers. With proposed algorithm we are also effectively setting aside 2 nodes' worth of resource capacity for HA reserves; however, due to the distributed nature of the HA reserves across the cluster 1600, the proposed approach facilitates bursting by the capacity by 2 nodes if no failures happen or bursting by the capacity of 1 node if one node fails.

As will be appreciated by those skilled in the art, in all examples, once f nodes have failed in a particular scenario, the HA spare capacity of the cluster from before the failures should be maintained by adding new nodes to the cluster. For example, for a scenario involving an 8-node cluster in which it is desired to tolerate a single node failure, if one node fails, a new node should be brought up within the cluster to allow another single-node failure to be tolerated in the future. Fortunately, provisioning new nodes on-demand in cloud is seamless and straightforward. Once the new node is up, the units of compute of the nodes that were be migrated as result of the previous failures can be migrated to the new nodes or all units of compute may be rescheduled from scratch along with their corresponding HA reserves.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 17:
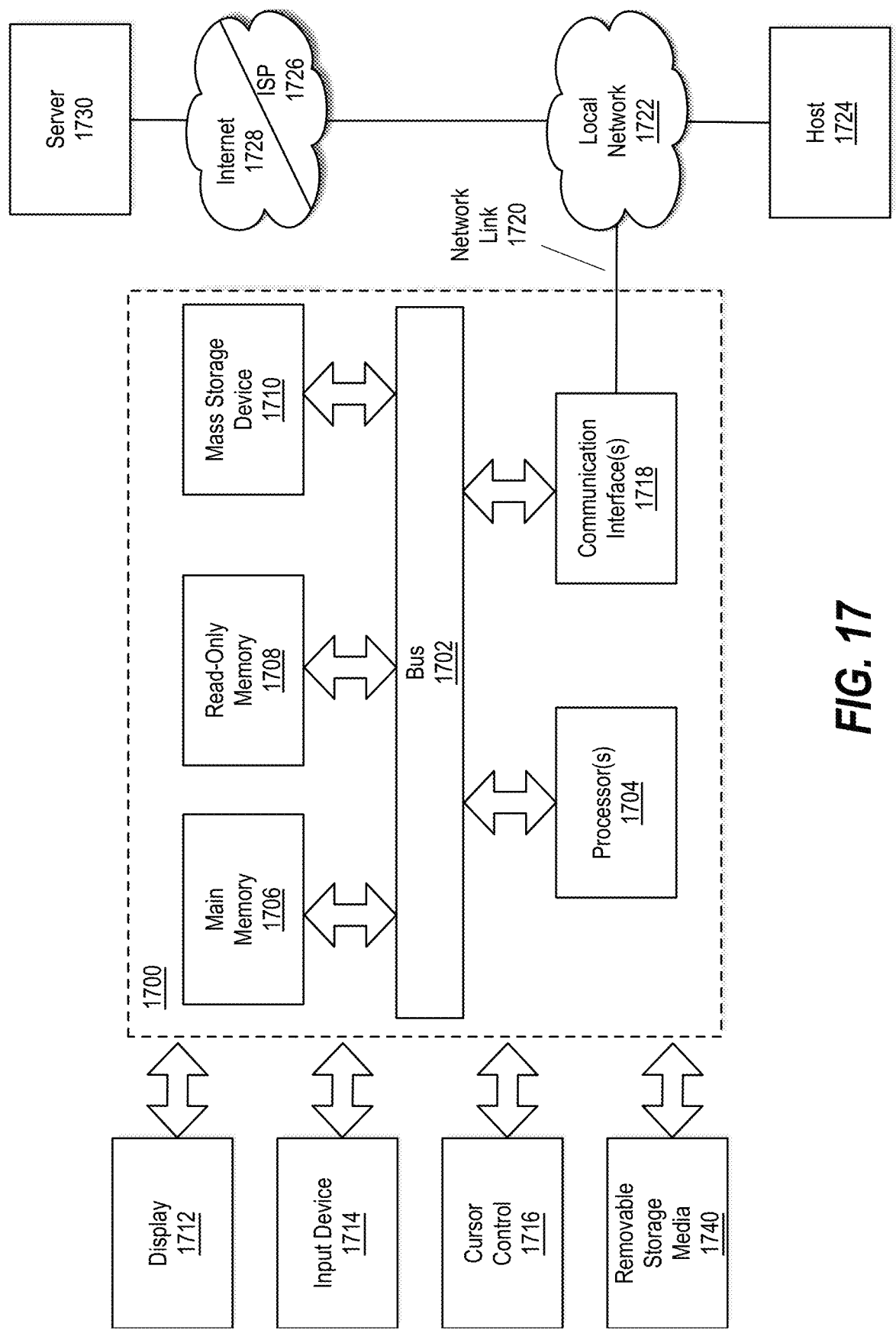
FIG. 17 illustrates an example computer system in which or with which embodiments of the present disclosure may be utilized.

FIG. 17 is a block diagram that illustrates a computer system 1700 in which or with which an embodiment of the present disclosure may be implemented. Computer system 1700 may be representative of all or a portion of the computing resources of a physical host (e.g., a server) representing a node (e.g., one of virtual storage systems 310a-c) of a cluster (e.g., a distributed storage system). Notably, components of computer system 1700 described herein are meant only to exemplify various possibilities. In no way should example computer system 1700 limit the scope of the present disclosure. In the context of the present example, computer system 1700 includes a bus 1702 or other communication mechanism for communicating information, and a processing resource (e.g., a hardware processor 1704) coupled with bus 1702 for processing information. Hardware processor 1704 may be, for example, a general-purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, e.g., a magnetic disk, optical disk or flash disk (made of flash memory chips), is provided and coupled to bus 1702 for storing information and instructions.

Computer system 1700 may be coupled via bus 1702 to a display 1712, e.g., a cathode ray tube (CRT), Liquid Crystal Display (LCD), Organic Light-Emitting Diode Display (OLED), Digital Light Processing Display (DLP) or the like, for displaying information to a computer user. An input device 1714, including alphanumeric and other keys, is coupled to bus 1702 for communicating information and command selections to processor 1704. Another type of user input device is cursor control 1716, such as a mouse, a trackball, a trackpad, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Removable storage media 1740 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1700 may implement the techniques described herein using customized hard-wired logic, one or more ASICs or FPGAs, firmware or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1710. Volatile media includes dynamic memory, such as main memory 1706. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the worldwide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718. The received code may be executed by processor 1704 as it is received, or stored in storage device 1710, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a non-transitory machine readable medium storing instructions, which when executed by scheduler of a container orchestration platform, cause the scheduler to: receive information indicative of a number (n) of a plurality of nodes that are part of a high-availability (HA) cluster and an amount (p) of resources to support a given unit of compute of a plurality of units of compute to be scheduled for execution by the HA cluster, wherein n is greater than 2; for a number (f) of concurrent node failures to be tolerated by the HA cluster, create a schedule for the HA cluster that accommodates concurrent execution of all of the plurality of units of compute by the HA cluster while reserving resource capacity within the HA cluster for failover by, for each unit of compute of the plurality of units of compute: assigning the unit of compute to a primary node of the plurality of nodes on which the unit of compute will be deployed; and earmarking units of HA reserve each having p resources replicated across f different secondary nodes of the plurality of nodes to accommodate failover of the unit of compute in the event of a failure of the primary node, wherein the units of HA reserve have been earmarked for no other unit of compute of the plurality of units of compute that are assigned to the primary node; and schedule the plurality of units of compute on the plurality of nodes in accordance with the schedule.

Example 2 includes the subject matter of Example 1, wherein the instructions further cause the scheduler to derive a value of f based on a desired uptime of a service represented by the plurality of units of compute.

Example 3 includes the subject matter of Examples 1-2, wherein the value off is derived by performing a mean time between failures (MTBF) analysis or a mean time to failure (MTTF) analysis.

Example 4 includes the subject matter of Examples 1-3, wherein each of the units of HA reserve is limited to being associated with n–f units of compute at most Example 5 includes the subject matter of Examples 1-4, wherein each unit of HA reserve of the units of HA reserve is atomically earmarked with f–1 other units of HA reserve across f distinct nodes of the plurality of nodes of the HA cluster. Such atomically earmarked units of HA reserve remain the exact replicas of each other going forward.

Example 6 includes the subject matter of Examples 1-5, wherein the resources include (i) one or more of central processing unit (CPU) resources or portions thereof and (ii) memory resources.

Example 7 includes the subject matter of Examples 1-6, wherein each unit of compute of the plurality of units of compute comprises a Kubernetes pod, a container, a virtual machine, or a process.

Example 8 includes the subject matter of Examples 1-7, wherein the schedule provides burst capacity on each of the plurality of nodes by spreading the units of HA reserve among the plurality of nodes.

Some embodiments pertain to Example 9 that includes a computer-implemented method comprising: receiving information indicative of a number (n) of a plurality of nodes that are part of a cluster and an amount (p) of resources to support a given unit of compute of a plurality of units of compute to be scheduled for execution by the cluster, wherein n is greater than 2; for a number (f) of concurrent node failures to be tolerated by the cluster, creating a schedule for the cluster that accommodates concurrent execution of all of the plurality of units of compute by the cluster while reserving resource capacity within the cluster for failover by, for each unit of compute of the plurality of units of compute: assigning the unit of compute to a primary node of the plurality of nodes on which the unit of compute will be deployed; and earmarking units of high-availability (HA) reserve each having p resources within f different secondary nodes of the plurality of nodes to accommodate failover of the unit of compute in event of a failure of the primary node, wherein the units of HA reserve have been earmarked for no other unit of compute of the plurality of units of compute that are assigned to the primary node; and scheduling the plurality of units of compute on the plurality of nodes in accordance with the schedule.

Example 10 includes the subject matter of Example 9, further comprising deriving a value of f based on a desired uptime of a service represented by the plurality of units of compute.

Example 11 includes the subject matter of Examples 9-10, wherein said deriving a value off includes performing a mean time between failures (MTBF) analysis or a mean time to failure (MTTF) analysis.

Example 12 includes the subject matter of Examples 9-11, wherein each of the units of HA reserve is limited to being associated with n–f units of compute.

Example 13 includes the subject matter of Examples 9-12, wherein each unit of HA reserve of the units of HA reserve is atomically earmarked with f–1 other units of HA reserve across f distinct nodes of the plurality of nodes of the HA cluster. Such atomically earmarked units of HA reserve remain the exact replicas of each other going forward.

Example 14 includes the subject matter of Example 9-13, wherein the resources include (i) one or more of central processing unit (CPU) resources or portions thereof and (ii) memory resources.

Example 15 includes the subject matter of Examples 9-14, wherein each unit of compute of the plurality of units of compute comprises a Kubernetes pod, a container, or a virtual machine.

Example 16 includes the subject matter of Examples 9-15, wherein each unit of compute of the plurality of units of compute comprises a process.

Example 17 includes the subject matter of Examples 9-16, wherein the schedule provides burst capacity on each of the plurality of nodes by spreading the units of HA reserve among the plurality of nodes.

Some embodiments pertain to Example 18 that includes a high-availability (HA) system comprising: a processing resource; and instructions that when executed by the processing resource cause the HA system or a scheduler associated therewith to: receive information indicative of a number (n) of a plurality of nodes that are part of a cluster and an amount (p) of resources to support a given unit of compute of a plurality of units of compute to be scheduled for execution by the cluster, wherein n is greater than 2; for a number (f) of concurrent node failures to be tolerated by the cluster, create a schedule for the cluster that accommodates concurrent execution of all of the plurality of units of compute by the cluster while reserving resource capacity within the cluster for failover by, for each unit of compute of the plurality of units of compute: assigning the unit of compute to a primary node of the plurality of nodes on which the unit of compute will be deployed; and earmarking units of high-availability (HA) reserve each having p resources within f different secondary nodes of the plurality of nodes to accommodate failover of the unit of compute in event of a failure of the primary node, wherein the units of HA reserve have been earmarked for no other unit of compute of the plurality of units of compute that are assigned to the primary node; and scheduling the plurality of units of compute on the plurality of nodes in accordance with the schedule.

Example 19 includes the subject matter of Example 18, wherein each unit of HA reserve of the units of HA reserve is atomically earmarked with f–1 other units of HA reserve across f distinct nodes of the plurality of nodes of the HA cluster. Such atomically earmarked units of HA reserve remain the exact replicas of each other going forward.

Example 20 includes the subject matter of Examples 18-19, wherein each unit of compute of the plurality of units of compute comprises a Kubernetes pod, a container, a virtual machine, or a process and wherein the schedule provides burst capacity on each of the plurality of nodes by spreading the units of HA reserve among the plurality of nodes.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by a scheduler of a container orchestration platform, cause the scheduler to:
receive information indicative of a number (n) of a plurality of nodes that are part of a high-availability (HA) cluster and an amount (p) of resources to support a given unit of compute of a plurality of units of compute to be scheduled for execution by the HA cluster, wherein n is greater than 2;
for a number (f) of concurrent node failures to be tolerated by the HA cluster, create a schedule for the HA cluster that accommodates concurrent execution of all of the plurality of units of compute by the HA cluster while reserving resource capacity within the HA cluster for failover by, for each unit of compute of the plurality of units of compute:
assigning the unit of compute to a primary node of the plurality of nodes on which the unit of compute will be deployed; and
earmarking a plurality of units of HA reserve each having p resources by replicating an HA reservation for a given unit of HA reserve across f different secondary nodes of the plurality of nodes to accommodate failover of the unit of compute in event of a failure of the primary node, wherein the given unit of HA reserve is earmarked for no other unit of compute of the plurality of units of compute assigned to the primary node; and
schedule the plurality of units of compute on the plurality of nodes in accordance with the schedule.

2. The non-transitory machine readable medium of claim 1, wherein the instructions further cause the scheduler to derive a value of f based on a desired uptime of a service represented by the plurality of units of compute.

3. The non-transitory machine readable medium of claim 2, wherein the value of f is derived by performing a mean time between failures (MTBF) analysis or a mean time to failure (MTTF) analysis.

4. The non-transitory machine readable medium of claim 1, wherein each of the plurality of units of HA reserve is limited to being associated with at most n-f units of compute.

5. The non-transitory machine readable medium of claim 4, wherein each unit of HA reserve of the plurality of units of HA reserve is atomically earmarked with f-1 other units of HA reserve across f distinct nodes of the plurality of nodes of the HA cluster.

6. The non-transitory machine readable medium of claim 1, wherein the resources include (i) one or more of central processing unit (CPU) resources or portions thereof and (ii) memory resources.

7. The non-transitory machine readable medium of claim 1, wherein each unit of compute of the plurality of units of compute comprises a pod, a container, a virtual machine, or a process.

8. The non-transitory machine readable medium of claim 1, wherein the schedule provides burst capacity on each of the plurality of nodes by spreading the units of HA reserve among the plurality of nodes.

9. A computer-implemented method comprising:
receiving information indicative of a number (n) of a plurality of nodes that are part of a cluster and an amount (p) of resources to support a given unit of compute of a plurality of units of compute to be scheduled for execution by the cluster, wherein n is greater than 2;
for a number (f) of concurrent node failures to be tolerated by the cluster, creating a schedule for the cluster that accommodates concurrent execution of all of the plurality of units of compute by the cluster while reserving resource capacity within the cluster for failover by, for each unit of compute of the plurality of units of compute:
assigning the unit of compute to a primary node of the plurality of nodes on which the unit of compute will be deployed; and
earmarking a plurality of units of HA reserve each having p resources by replicating an HA reservation for a given unit of HA reserve across f different secondary nodes of the plurality of nodes to accommodate failover of the unit of compute in event of a failure of the primary node, wherein the given unit of HA reserve is earmarked for no other unit of compute of the plurality of units of compute assigned to the primary node; and
scheduling the plurality of units of compute on the plurality of nodes in accordance with the schedule.

10. The method of claim 9, further comprising deriving a value of f based on a desired uptime of a service represented by the plurality of units of compute.

11. The method of claim 10, wherein said deriving a value of f includes performing a mean time between failures (MTBF) analysis or a mean time to failure (MTTF) analysis.

12. The method of claim 9, wherein each of the plurality of units of HA reserve is limited to being associated with n-f units of compute.

13. The method of claim 12, wherein each unit of HA reserve of the plurality of units of HA reserve is atomically earmarked with f-1 other units of HA reserve across f distinct nodes of the plurality of nodes of the HA cluster, wherein atomically earmarked units of HA reserve remain the exact replicas of each other going forward.

14. The method of claim 9, wherein the resources include (i) one or more of central processing unit (CPU) resources or portions thereof and (ii) memory resources.

15. The method of claim 9, wherein each unit of compute of the plurality of units of compute comprises a pod, a container, or a virtual machine.

16. The method of claim 9, wherein each unit of compute of the plurality of units of compute comprises a process.

17. The method of claim 9, wherein the schedule provides burst capacity on each of the plurality of nodes by spreading the units of HA reserve among the plurality of nodes.

18. A high-availability (HA) system comprising:
one or more processing resources; and
instructions that when executed by the one or more processing resources cause the HA system or a scheduler associated therewith to:

receive information indicative of a number (n) of a plurality of nodes that are part of a cluster and an amount (p) of resources to support a given unit of compute of a plurality of units of compute to be scheduled for execution by the cluster, wherein n is greater than 2;

for a number (f) of concurrent node failures to be tolerated by the cluster, create a schedule for the cluster that accommodates concurrent execution of all of the plurality of units of compute by the cluster while reserving resource capacity within the cluster for failover by, for each unit of compute of the plurality of units of compute:

assigning the unit of compute to a primary node of the plurality of nodes on which the unit of compute will be deployed; and earmarking a plurality of units of HA reserve each having p resources by replicating an HA reservation for a given unit of HA reserve across f different secondary nodes of the plurality of nodes to accommodate failover of the unit of compute in event of a failure of the primary node, wherein the given unit of HA reserve is earmarked for no other unit of compute of the plurality of units of compute that are assigned to the primary node; and scheduling the plurality of units of compute on the plurality of nodes in accordance with the schedule.

19. The HA system of claim 18, wherein each unit of HA reserve of the units of HA reserve is atomically earmarked with f−1 other units of HA reserve across f distinct nodes of the plurality of nodes of the HA cluster, wherein atomically earmarked units of HA reserve remain the exact replicas of each other going forward.

20. The HA system of claim 18, wherein each unit of compute of the plurality of units of compute comprises a pod, a container, a virtual machine, or a process and wherein the schedule provides burst capacity on each of the plurality of nodes by spreading the units of HA reserve among the plurality of nodes.

* * * * *

UNITED STATES PATENT AND TRADEMARK OFFICE
CERTIFICATE OF CORRECTION

PATENT NO. : 12,222,827 B2
APPLICATION NO. : 17/898824
DATED : February 11, 2025
INVENTOR(S) : Ardalan Kangarlou Page 1 of 1

It is certified that error appears in the above-identified patent and that said Letters Patent is hereby corrected as shown below:

In the Claims

Column 37, Line 52 should be changed from "the value of fis" to --the value of f is--

Column 40, Lines 4 and 5 should be changed from "units of compute that are assigned" to --units of compute assigned--

Signed and Sealed this
Second Day of September, 2025

Coke Morgan Stewart
*Acting Director of the United States Patent and Trademark Office*